US012326596B2

(12) United States Patent
Bryon et al.

(10) Patent No.: US 12,326,596 B2
(45) Date of Patent: Jun. 10, 2025

(54) FLEXIBLE ORGANIZER AND SELF-SUPPORTING UNIT

(71) Applicant: COMMSCOPE TECHNOLOGIES LLC, Hickory, NC (US)

(72) Inventors: Roel Modest Willy Bryon, Kessel-Lo (BE); Jan Willem Rietveld, Benschop (NL); Philippe Coenegracht, Hasselt (BE); Johan Geens, Bunsbeek (BE); Pieter Vermeulen, Westerlo (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 18/393,540

(22) Filed: Dec. 21, 2023

(65) Prior Publication Data

US 2024/0126021 A1     Apr. 18, 2024

Related U.S. Application Data

(63) Continuation of application No. 17/843,061, filed on Jun. 17, 2022, now Pat. No. 11,892,683, which is a
(Continued)

(51) Int. Cl.
*G02B 6/44* (2006.01)
*G02B 6/36* (2006.01)

(52) U.S. Cl.
CPC ......... *G02B 6/3608* (2013.01); *G02B 6/4439* (2013.01)

(58) Field of Classification Search
CPC ........ G02B 6/4439; G02B 6/444–4441; G02B 6/4446; G02B 6/445; G02B 6/44515; G02B 6/4452
See application file for complete search history.

(56) References Cited

U.S. PATENT DOCUMENTS

| 4,648,168 A | 3/1987 | Nolf et al. |
| 5,109,983 A | 5/1992 | Malone et al. |

(Continued)

FOREIGN PATENT DOCUMENTS

| WO | 2013/039788 A2 | 3/2013 |
| WO | 2013/039790 A2 | 3/2013 |

(Continued)

OTHER PUBLICATIONS

International Search Report and Written Opinion of the International Searching Authority for International Patent Application No. PCT/US2019/025869 mailed Jul. 23, 2019, 12 pages.

(Continued)

*Primary Examiner* — Michael Stahl
(74) *Attorney, Agent, or Firm* — MERCHANT & GOULD P.C.

(57) ABSTRACT

The present disclosure relates to a fiber management device or system for facilitating routing and storing optical fibers. The fiber management device includes a flexible, film-like substrate that has optical fiber management, storing functionality, and splicing functionality all on one film-like substrate. The flexible, film-like substrate can provide a routing path for routing optical fibers onto a flexible planar substrate that can be temporarily supported by, mounted on or attached to the flexible planar substrate. The flexible, film-like substrate can accommodate fibers that are in a multi-fiber (e.g., ribbon) configuration or a single fiber configuration.

3 Claims, 18 Drawing Sheets

Related U.S. Application Data continuation of application No. 17/045,731, filed as application No. PCT/US2019/025869 on Apr. 4, 2019.

(60) Provisional application No. 62/654,146, filed on Apr. 6, 2018, provisional application No. 62/811,961, filed on Feb. 28, 2019.

(56) References Cited

U.S. PATENT DOCUMENTS

| | | |
|---|---|---|
| 5,790,738 A | 8/1998 | Parzygnat |
| 5,902,435 A | 5/1999 | Meis et al. |
| 5,943,455 A | 8/1999 | Travieso et al. |
| 6,327,139 B1 | 12/2001 | Champion et al. |
| 7,113,686 B2 | 9/2006 | Bellekens et al. |
| 7,233,712 B2 | 6/2007 | Arellano |
| 7,397,997 B2 | 7/2008 | Mertesdorf et al. |
| 7,844,158 B2 | 11/2010 | Gronvall et al. |
| 11,397,295 B2 | 7/2022 | Bryon et al. |
| 2002/0015563 A1 | 2/2002 | Murakami et al. |
| 2003/0075646 A1 | 4/2003 | Womack et al. |
| 2003/0194187 A1 | 10/2003 | Simmons et al. |
| 2004/0213505 A1 | 10/2004 | Saito et al. |
| 2007/0160339 A1 | 7/2007 | Bellekens et al. |
| 2013/0216196 A1 | 8/2013 | Cairns |
| 2016/0274321 A1 | 9/2016 | McCean et al. |
| 2020/0003980 A1 | 1/2020 | Luetjen et al. |
| 2021/0278594 A1 | 9/2021 | Beri et al. |
| 2022/0276456 A1* | 9/2022 | Bishop ............... G02B 6/44528 |
| 2022/0317383 A1 | 10/2022 | Bryon et al. |

FOREIGN PATENT DOCUMENTS

| | | |
|---|---|---|
| WO | 2014/052441 A1 | 4/2014 |
| WO | 2014/052446 A1 | 4/2014 |
| WO | 2014/055859 A1 | 4/2014 |
| WO | 2016/020262 A1 | 2/2016 |
| WO | 2018/046677 A1 | 3/2018 |
| WO | 2018/085767 A1 | 5/2018 |
| WO | 2018/193005 A1 | 10/2018 |
| WO | 2019/040742 A1 | 2/2019 |

OTHER PUBLICATIONS

Extended European Search Report for European Patent Application No. 19782307.3 mailed Feb. 15, 2022, 13 pages.

* cited by examiner

FLEXIBLE ORGANIZER AND SELF-SUPPORTING UNIT

CROSS-REFERENCE TO RELATED APPLICATIONS

This application is a continuation of U.S. patent application Ser. No. 17/843,061, filed on Jun. 17, 2022, now U.S. Pat. No. 11,892,683, which is a continuation of U.S. patent application Ser. No. 17/045,731, filed on Oct. 6, 2020, now U.S. Pat. No. 11,397,295, which is a National Stage Application of PCT/US2019/025869, filed on Apr. 4, 2019, which claims the benefit of U.S. Patent Application Ser. No. 62/654,146, filed on Apr. 6, 2018, and claims the benefit of U.S. Patent Application Ser. No. 62/811,961, filed on Feb. 28, 2019, the disclosures of which are incorporated herein by reference in their entireties. To the extent appropriate, a claim is made to each of the above disclosed applications.

TECHNICAL FIELD

The present disclosure relates generally to telecommunications management devices. More specifically, the present disclosure relates to fiber management devices and systems for managing optical fibers.

BACKGROUND

Various modules are commonly used to manage, store and protect optical fibers and optical splices. Typically, these modules include trays that have relatively hard, plastic constructions and include added structures for routing optical fibers and splicing locations. There is a need for systems and devices for managing and storing optical fibers with ease.

SUMMARY

Certain aspects of the present disclosure relate to a fiber management device or system for facilitating routing and storing optical fibers.

Aspects of the present disclosure relates to a flexible, film-like substrate that has optical fiber management, storing functionality, and optionally splicing functionality all on one film-like substrate. Various types of splicing can be used to splice single fibers or multi-fibers, for example, mechanical splices, fusion splices, etc.

The flexible, film-like substrate provides a routing path for routing optical fibers onto a flexible planar substrate that can be temporarily supported by, mounted on or attached to the flexible planar substrate. The flexible, film-like substrate can accommodate fibers that are in a multi-fiber (e.g., ribbon) configuration or a single fiber configuration.

In one example, the flexible, film-like substrate includes adhesive for retaining first lengths of optical fibers along a desired fiber routing path. The flexible, film-like substrate can further include fiber management structures for storing second lengths of optical fibers loosely constrained (e.g., unfixed) or managed on the flexible, film-like substrate. The fiber management structures are integral with (e.g., formed in one seamless piece with) the flexible, film-like substrate such that no additional structure is needed to provide management or storing functionality. Thus, systems in accordance with the present disclosure can have the benefit of fixed fiber routing in combination with non-fixed fiber routing, splice mounting functionality, and storing fibers or pigtails all in one film-like substrate without any additional parts.

Another aspect of the present disclosure relates to mounting structures (e.g., fixation holes, openings, apertures) that can be used to mount the flexible, film-like substrate to a wall, enclosure, or other structure. The mounting structures can be defined by the flexible, film-like substrate such that they are integrally made with (e.g., formed in one seamless piece with) the flexible, film-like substrate.

Another aspect of the present disclosure relates to a telecommunications fiber management device that includes a flexible film with a plurality of fiber management tabs having base ends unitary with a main body of the film and free ends positioned opposite from the base ends. The fiber management tabs can be capable of being resiliently flexed relative the main body from an at rest position to a flexed position. The fiber management tabs can be co-planar with the main body when in the at rest position. The free ends of the fiber management tabs can be upwardly offset from the main body when in the flexed position such that an optical fiber can be inserted beneath the fiber management tabs and secured between the fiber management tabs and the main body.

Another aspect of the present disclosure relates to a fixture for use in loading optical fibers into a telecommunications fiber management device. The fixture can include posts moveable between first positions in which the posts are extended to hold fiber management tabs of the telecommunications fiber management device in the flexed positions to facilitate loading optical fibers under the fiber management tabs, and second positions in which the posts are retracted to allow the fiber management tabs to move back toward the at rest positions.

A further aspect of the present disclosure relates to a telecommunications enclosure that includes a housing and a plurality of ruggedized fiber optic adapters secured to the housing. The ruggedized fiber optic adapters can include hardened connector ports accessible from outside the housing and non-hardened connector ports accessible from inside the housing.

The telecommunications enclosure can include a flexible film including a main body and a plurality of fiber management tabs. The fiber management tabs can include base ends unitary with the main body and free ends positioned opposite from the base ends. The fiber management tabs can be capable of being resiliently flexed relative the main body from an at rest position to a flexed position. The fiber management tabs can be co-planar with the main body when in the at rest position. The free ends of the fiber management tabs can be offset from the main body when in the flexed position.

The main body can have a first section and a second section with at least some of the fiber management tabs provided at each of the first and second sections. The main body of the flexible film can be movable between a first state in which the first and second sections are generally planar and a second state in which the first and second sections generally oppose one another.

The telecommunications enclosure can include first optical fibers including a first coil portion secured to the first section by a first set of the fiber management tabs and second optic fibers including a second coil portion secured to the first section by a second set of the fiber management tabs.

The first and second optic fibers can be spliced together at splice locations supported by a splice holder attached to the first section. The first optical fibers can extend from the first section to the second section and can be secured to the second section by further ones of the fiber management tabs. The flexible film can be mountable in the housing and can be oriented in the second state when in the housing.

The first optical fibers can have connectorized ends adjacent the second section that plug into the non-hardened connector ports of the fiber optic adapters.

The various aspects characterized above in this section can be used together or separately in enclosure arrangements.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
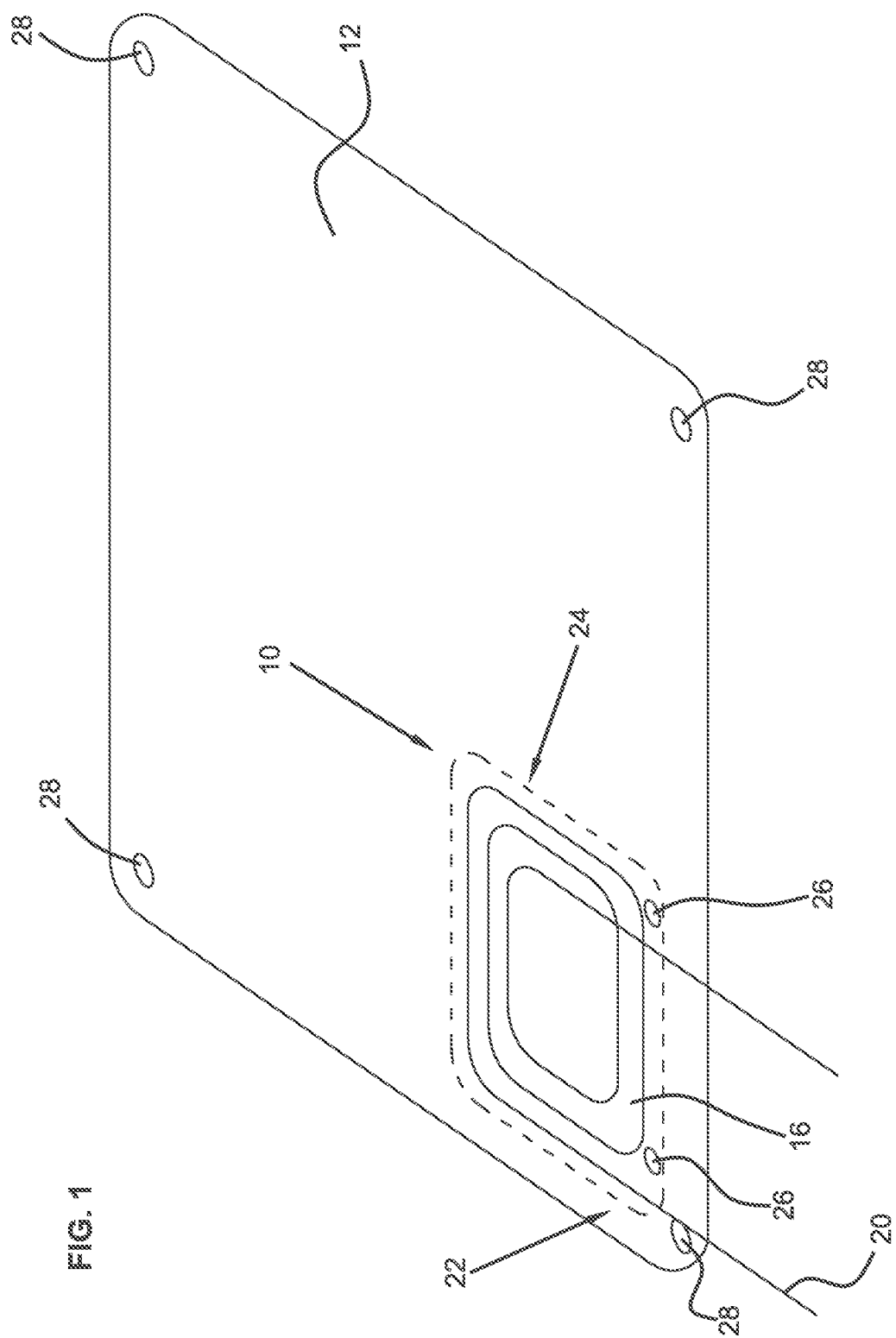
FIG. 1 is a top, perspective view of an example of a flexible, film-like substrate in accordance with principles of the present disclosure.

The present disclosure is directed generally to a fiber management device that includes a flexible, film-like substrate. In certain examples, the flexible, film-like substrate of the present disclosure provides fixed fiber routing functionality, loose fiber routing functionality, loose fiber storage, storage functionality, and optionally splice mounting capability configured all on one single flexible, film-like substrate. In certain examples, the optical fibers can be terminated by a fiber optic connector or fiber optic connectors. Non-limiting examples of connectors include MPO style connectors, and single or duplex fiber connectors, such as LC or SC type connectors.

The flexible, film-like substrate can include one or more (typically, multiple) optical fibers attached to and supported by a flexible planar substrate, such as a Mylar™ or other flexible polymer substrate. Although specific examples herein depict and describe planar substrates, it should be appreciated that other substrate configurations, e.g., in which a substrate routes fibers in and/or across multiple planes are also contemplated. In certain examples, the fibers can extend past the ends of the flexible, film-like substrate so that they can be terminated to optical connectors, which can be coupled to fiber optic cables or other fiber optic components through mating optical connectors. In certain examples, the optical fibers can include first portions fixedly managed by or routed on (e.g., via adhesive bonding) the substrate and second portions non-fixedly stored, routed by or otherwise managed by the substrate. In one example, the non-fixed fiber portion can be stored or arranged in a coil or loop of optical fiber that is removable/detachable from the substrate.

The flexible, film-like substrate can be a composite structure the includes at least three layers of which two layers are flexible planar substrates, such as Mylar™, and the third layer includes an adhesive material. Example adhesives include epoxy, light curable adhesive (e.g., ultraviolet light curable adhesive), thermo-form adhesive, thermo-set adhesive, index-matching adhesive or other adhesives. In certain examples, the adhesive material can be deposited on top of a first flexible planar substrate and a second flexible planar substrate can be laminated to the first flexible planar substrate such that the adhesive material is sandwiched between the first and second flexible planar substrates.

Supporting the optical fibers on a flexible, film-like substrate essentially comprises one or more fibers being routed on a flexible planar substrate, typically with a needle extending from a robotic arm, and then securing the routed fibers to the flexible planar substrate with an adhesive, which is allowed to set or cure. In some examples, therefore, the uncured adhesive is pre-applied to the substrate before the fiber routing. Furthermore, in some examples, an additional optional layer of material can be applied on top of the fibers and the adhesive to affix the fibers. Any suitable material can be used for this purpose. In a non-limiting example, an elastomer such as silicone can be applied on top of the fibers and the adhesive on the substrate. In some examples, the elastomer is cured after application to the substrate; in other examples, the silicone can be pre-cured.

The method of assembly of the flexible, film-like substrate of the present disclosure provides a number of advantages, which will be discussed in further detail below. For example, no additional features or supports are needed for providing optical fiber management and storage on the flexible, film-like substrate.

Aspects of the present disclosure relate to the flexible, film-like substrate optionally having a flexibility that flexes up to but not beyond a minimum bend radius of an optical fiber intended to be managed. In one example, the optical fiber is a G657A or G652D optical fiber. In one example, a plurality of different types of optical fibers are intended to be managed by the flexible, film-like substrate, and the minimum bend radius beyond which the flexible, film-like substrate does not flex corresponds to the minimum bend radius of the optical fiber having the highest minimum bend radius of the optical fibers (i.e., the manger can be designed for the worse-case scenario). Preferably, the flexible, film-like substrate does not break or kink to ensure the safety and protection of the optical fibers. In certain examples, the flexible, film-like substrate is bendable in such a way that the optical fiber bend radius requirements are respected and satisfied.

In other examples, the flexible, film-like substrate may have a flexibility that allows the flexible, film-like substrate to flex along a bend smaller than a minimum bend radius of the optical fiber or fibers being managed.

In certain examples, the flexible, film-like substrate has a construction that prevents the flexible, film-like substrate from being bent along a curvature having a radius smaller than a minimum bend radius of the optical fiber intended to be managed on the flexible, film-like substrate. In certain examples, the flexible, film-like substrate has a construction that allows it to be bent along a curvature having a radius smaller than 10 centimeters (cm), or 8 cm, or 6 cm, or 5 cm, or 4 cm, or 3 cm or 2 cm without breaking or kinking, and optionally prevents the flexible, film-like substrate from being bent along a curvature having a radius smaller than a minimum bend radius of the optical fiber intended to be managed on the flexible, film-like substrate.

Figure 2:
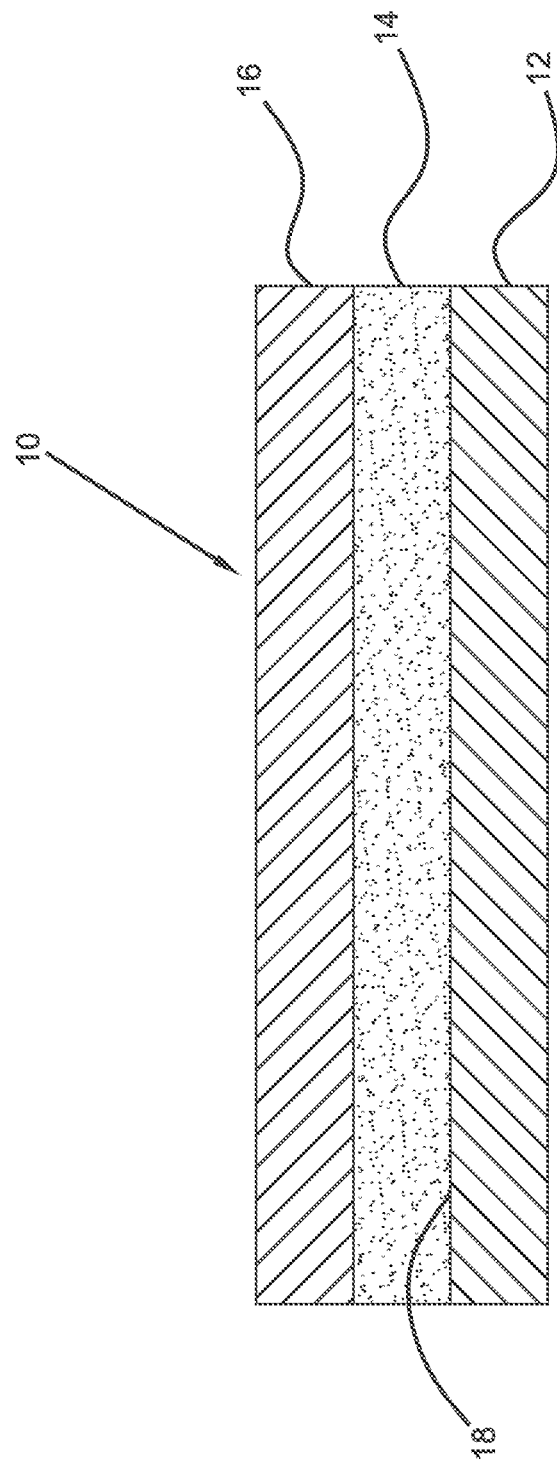
FIG. 2 is cross-sectional view showing multiple layers of the flexible, film-like substrate of FIG. 1.

FIG. 1 is a schematic top view of an example flexible, film-like substrate 10 (e.g., final product cut from bulk substrate, fiber manager, fiber management substrate, sheet, film, liner, sleeve, envelope, thin tray, carrier, etc.), such as Mylar™, in accordance with the present disclosure. The flexible, film-like substrate 10 is a multi-layer substrate that can include: a first planar flexible substrate layer 12 (e.g., base substrate layer, bottom substrate layer, bulk substrate), an adhesive layer 14 (e.g., epoxy), and an optional second planar flexible substrate layer 16 (e.g., top substrate layer) (see FIG. 2), although alternatives are possible.

The first planar flexible substrate layer 12 has a top surface 18 onto which the adhesive layer 14 can be deposited for holding routed optical fiber 20 (e.g., pre-fibered layer) on the first planar flexible substrate layer 12. The second planar flexible substrate layer 16 can be affixed to the first planar flexible substrate layer 12 via the adhesive layer 14 such that the routed optical fiber 20 can be secured between the first and second planar flexible substrate layers 12, 16. As such, the adhesive can control the routing path of optical fibers. The first and second planar flexible substrate layers 12, 16 together forming a sealed attachment to seal and provide protection for the optical fiber 20.

It will be appreciated that a variety of routing configurations can be used for routing the optical fiber 20 on the first planar flexible substrate layer 12. Although, a single optical fiber 20 is illustrated, it will be appreciated that any number of optical fibers may be routed on the first planar flexible substrate layer 12. In other examples, there may be 12 fibers, 24 fibers, or any other number of fibers routed on the first planar flexible substrate layer 12. The process of routing the optical fiber 20 can be an automated process, although alternatives are possible. In certain examples, the optical fiber 20 can be routed onto the first planar flexible substrate layer 12 with a needle extending from a robotic arm. That is, to route the fibers on the first planar flexible substrate layer 12, in some examples the fiber can be laid on the first planar flexible substrate layer 12 by being passed through a needle controlled by robotics, the robotics being configured to route the fiber along a predefined path on the first planar flexible substrate layer 12. The robotics can be configured to route the fiber in a single plane or across multiple planes; similarly, separate fibers can be routed in the same or different plane(s) of the substrate as other fibers. As it routes the optical fibers, the needle can be configured to press the optical fibers onto an adhesive layer that has been pre-applied to the first planar flexible substrate layer 12. In some examples, the fiber is dispensed from a spool and a cutting device disposed at or near the needle end is configured to cut a length of fiber after it has been laid on the first planar flexible substrate layer 12 so that the next length of fiber can be laid. It will be appreciated that a variety of optical fiber routing configurations can be arranged on the first planar flexible substrate layer 12.

As mentioned, in some examples, the routed fibers are secured to the first planar flexible substrate layer 12 by adhesive. In some examples, the optical fibers pass through the needle onto an uncured adhesive layer on the first planar flexible substrate layer 12, and then the adhesive and/or an elastomeric or other fiber fixating material applied to the adhesive is allowed to cure to secure the fibers to the first planar flexible substrate layer 12. The paths and lengths of the individually routed fibers can vary from fiber to fiber.

The flexible, film-like substrate 10 can include a desired routing path of optical fiber 20 secured thereon. The flexible, film-like substrate 10 can be cut out into multiple shapes and/or sizes. The cutting process can be accomplished by any known cutting techniques. For example, a cutout area 22 of the flexible, film-like substrate 10 can be cut as indicated at an indication line 24 (e.g., cutting line, cutting zone, final product cut-out boundary). The flexible, film-like substrate 10 can be cut to any desired shape. The fixed routing of the optical fibers can be performed in the factory. In certain examples, any known arrangements, operations, controlling machines or devices for cutting, cutting-out, stamping out, punching, perforating and also for severing may be used.

The flexible, film-like substrate 10 can include mounting structures 26 (e.g., fixation holes, openings, apertures, notch) that can be used to mount the flexible, film-like substrate 10 to a wall, enclosure, module, or other structure. The mounting structures 26 can be defined by the flexible, film-like substrate 10 such that they are integrally made with (e.g., formed in one seamless piece with) the flexible, film-like substrate 10. The mounting structures 26 can be cut from either the first and second planar flexible substrate layers 12, 16 through to the other one of the first and second planar flexible substrates 12, 16. That is, the mounting structures 26 can extend through both the first and second planar flexible substrate layers 12, 16, although alternatives are possible. In certain examples, the mounting structures 26 may be defined in one of the first and second planar flexible substrate layers 12, 16. The mounting structures 26 are within the cutout area 22 and are intended to be included as part of the final fiber management product after the final management product has been cut from the bulk base substrate (e.g., substrate layer 12). The mounting structures 26 can be used to attach or mount the final management product in its final intended use. For example, the mounting structures 26 can be used for positioning or attaching the final product in a fiber optic module, in a fiber optic housing, to a fiber optic panel, to a fiber optic frame, to a fiber optic tray or elsewhere.

In certain examples, the flexible, film-like substrate 10 can include fixation holes 28 for mounting the flexible, film-like substrate 10 in a fixation device for alignment control and support during assembly. The fixation holes 28 are not within the boundary defined by the indication line 24 and are not part of the final fiber optic product. The fixation holes 28 are used to hold the bulk base substrate in place when the adhesive, optical fibers, and other layers are applied to the base substrate, but are not part of the final product.

The flexible, film-like substrate 10 including the pre-fibered layer can be made in a production facility and may be used in the field for further assembly with other elements. For example, the flexible, film-like substrate 10 can provide for the capability of supporting splicing in the field.

Figure 3:
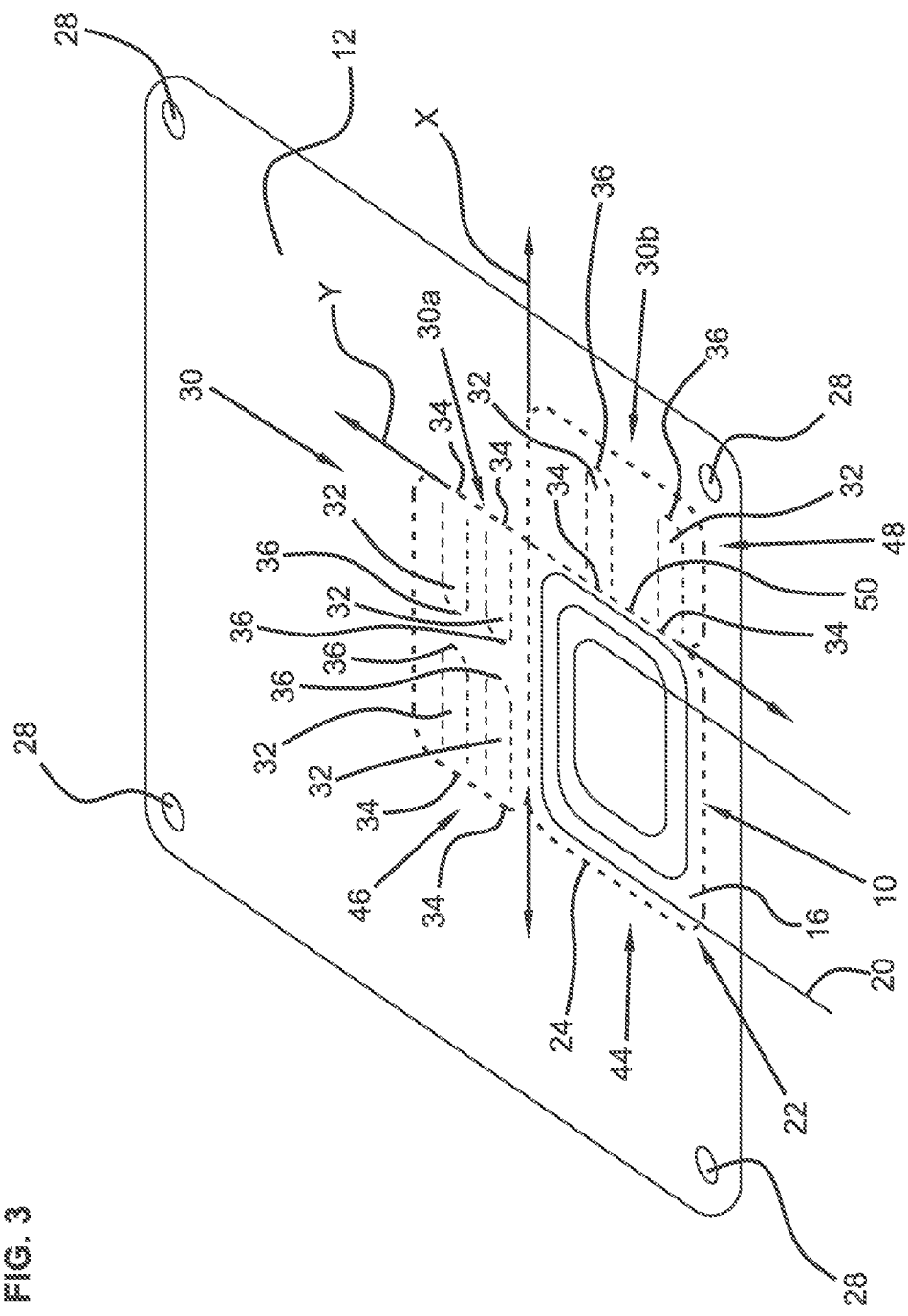
FIG. 3 is a top, perspective view of another example flexible, film-like substrate in accordance with the principles of the present disclosure.

Turning to FIG. 3, an example fiber management device 30 is depicted. The fiber management device 30 can include the flexible, film-like substrate 10. The flexible, film-like substrate 10 can include a first flexible portion 44 with at least one optical fiber 20 adhesively secured thereon and a second flexible portion 46 with at least one optical fiber management structure 32 for storing a length of optical fiber loosely constrained thereon. In certain examples, the flexible, film-like substrate 10 may include a third flexible portion 48 for storing lengths of optical fiber loosely constrained on the flexible, film-like substrate 10. The first flexible portion 44 is arranged and configured to hold optical fibers in a fixed routing path. The first, second, and third flexible portions 44, 46, 48 may be cut out of the flexible, film-like substrate 10 as defined by the cutout area 22 along the indication line 24, which defines an outer boundary of the final fiber management product to be cut from the bulk body of the substrate 10. The cutout area 22 is the shape of the final product prior to folding. In certain examples, the final product formed by the first, second, and third flexible portions 44, 46, 48 may be mounted or placed in an enclosure, organizer, or other telecommunications equipment. The flexible, film-like substrate 10 can have features that allow connection with other structures.

In certain examples, the flexible, film-like substrate 10 may include a fold line 50 (e.g., a perforated line, scored line, crease or other structure for defining a fold location) along a portion of a lateral axis X of the flexible, film-like substrate 10. The fold line 50 can divide the flexible, film-like substrate 10 into the first and second flexible portions 44, 46. In certain examples, the flexible, film-like substrate 10 may include a fold line 50 along a longitudinal axis Y that is perpendicular relative to the lateral axis X. The fold line 50 can divide the flexible, film-like substrate 10 into the first and third flexible portions 44, 48. The second and third flexible portions 46, 48 can be folded at the fold lines 50 to be disposed in a parallel, overlying relation relative to the first flexible portion 44.

In certain examples, at least one mounting structure 26 may be located in at least one of the first and second flexible portions 44, 46, although alternatives are possible. In certain examples, at least one mounting structure 26 may be located inside the final product cut-out boundary, the indication line 24, in at least one of the first, second, and third flexible portions 44, 46, 48. The at least one mounting structure 26 (e.g., a mounting opening or openings) can be positioned offset from the fold lines 50. In certain examples, the mounting structures 26 can be used for fixating to allow connections to other elements. Thus, no support or additional parts are needed. The flexible, film-like substrate 10 can include other perforations or precut shapes within the final product cut-out boundary 24 such that separate trays may not be needed in an enclosure or organizer.

In certain examples, the flexible, film-like substrate 10 may include just the first flexible portion 44 with at least one optical fiber adhesively secured thereon and the mounting structures 26 for mounting the final product defined by the flexible, film-like substrate 10. As described above, the mounting structures 26 can be integral with the flexible, film-like substrate 10 of the final product.

A cutting tool (e.g., a laser, a blade, or other cutting tool) may be used to make cuts or incisions in the second and third flexible portions 46, 48 of the flexible, film-like substrate 10 to create at least one optical fiber management structure (e.g., a fiber management/routing tab, retainer, lip, finger, etc.), generally designated 32. It will be appreciated that various shapes may be formed in the flexible, film-like substrate 10 by a cutting tool (not shown) for managing optical fibers. As depicted, the at least one optical fiber management structure 32 is integral with the flexible, film-like substrate 10. The fiber management structure 32 can have a free end to create a flap or folding tab. In other words, the optical fiber management structures 32 can be fixed at a first end 34 and unattached at the other second end 36 for routing optical fibers underneath. As such, the optical fiber management structures 32 may provide fiber management that is not adhesive based. As shown, fiber can be routed under and inside the tabs. In other examples, the tabs can be configured for fibers to be routed under and around the tabs. Although four management structures 32 are depicted in the second flexible portion 46, any number of management structures 32 may be formed thereon and in any shape. Although two management structures 32 are depicted in the third flexible portion 48, any number of management structures 32 may be formed thereon and in any shape. The management structures 32 can be used for storing lengths of optical fibers loosely constrained on the flexible, film-like substrate 10. That is, the management structures 32 can be used to manage optical fibers that are not adhesively attached. The management structures 32 may be flexed up to route loose, unfixed ends of optical fibers underneath. The management structure 32 may allow optical fibers to be bent or coiled or wrapped at an appropriate bend radius for the optical fiber. The fiber management structures 32 can be used to store and retain the optical fiber and help prevent displacement of the optical fiber. Of course, in alternative embodiments, the flexible, film-like substrate 10 can comprise other structural elements, to manage optical fibers, as would be apparent to one of ordinary skill. The management structures 32 can be created in any shape or size by a cutting process, for example. The management structures 32 can take the shape of a cylinder, an oval, or an ellipse, although alternatives are possible.

Figure 4:
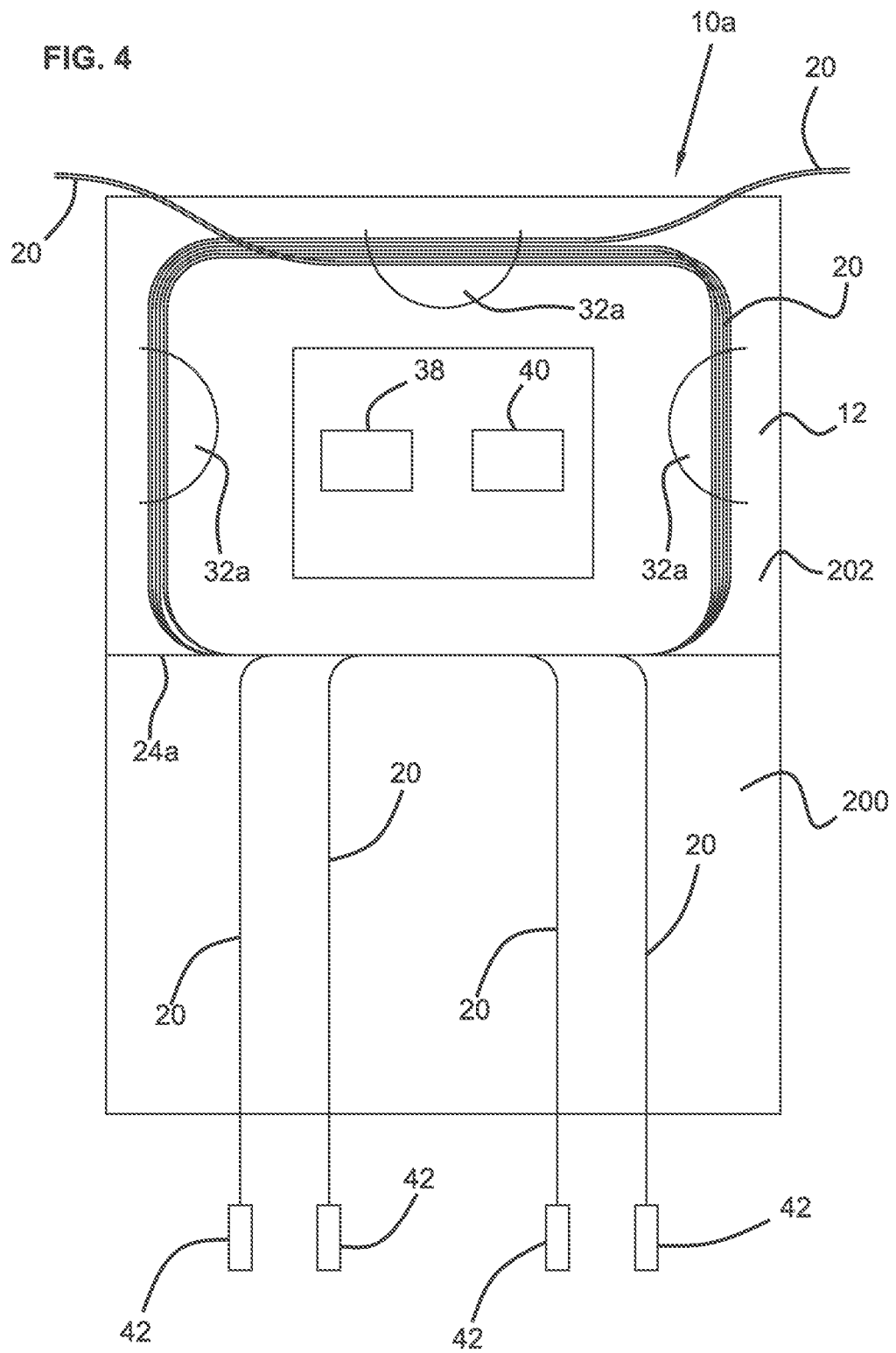
FIG. 4 is a top, perspective view of another example flexible, film-like substrate in accordance with the principles of the present disclosure.

Referring to FIG. 4, another example flexible, film-like substrate 10a is depicted with management structures 32a. The management structures 32a can be integral with (e.g., formed in one seamless piece with) the flexible, film-like substrate 10a. The management structures 32a can be arranged and configured to manage loose/unattached optical fibers. For example, routed optical fibers may include excess fiber length that can be stored (e.g., in a coiled configuration) for use in later optical splicing. A portion of the optical fiber 20 routed and managed by the management structures 32 can be routed to an optical splice location 38. In certain examples, the optical fiber 20 may be a bare fiber, although alternatives are possible. In certain examples, the optical fiber 20 may be upjacketed, although alternatives are possible. In certain examples, the optical fiber 20 may be coated, although alternatives are possible. For example, while in the field, there may be a need to splice the optical fiber 20 to another fiber on the same flexible, film-like substrate 10a. In certain examples, the splice can be supported on the flexible, film-like substrate 10a, that is, the portion of the fiber or fibers containing the splice can be secured on the flexible substrate. The splice can be a mechanical splice or a fusion splice. A splice reinforcing structure for protecting the splice location can be bonded or otherwise attached to or supported by the flexible, film-like substrate 10a. In other examples, the field splice may not be supported on the flexible, film-like substrate 10a; that is, the splice can be positioned, e.g., forward of a forward edge or rearward of a rearward edge of the flexible, film-like substrate 10a. In certain examples, the optical fiber 20 may be routed to a splitter 40 on the flexible, film-like substrate 10a.

Any excess fiber length may also be stored on the flexible, film-like substrate 10a in loops by the management structures 32a. The management structures 32a may be flexed up to route optical fibers underneath. To transition from fixed fiber at substrate location 200 to loose fiber at substrate location 202, the optical fiber may be routed parallel along a fold line 24a such that no kinks or bends develop along the route during folding of the flexible, film-like substrate 10a. In certain examples, the optical fibers 20 can be routed such that loose, unfixed ends extend past the outer boundary of the flexible, film-like substrate 10a. In certain examples, the optical fibers 20 may be terminated by fiber optic connectors 42. The fiber optic connectors 42 can be single-fiber optical connectors or multi-fiber optical connectors. Example fiber optic connectors can include SC connectors, LC connectors, FC connectors, FT connectors, ST connectors, and MPO/MTP connectors. The fiber optic connectors 42 can be later plugged into fiber optic adapters (not shown).

Figure 5:
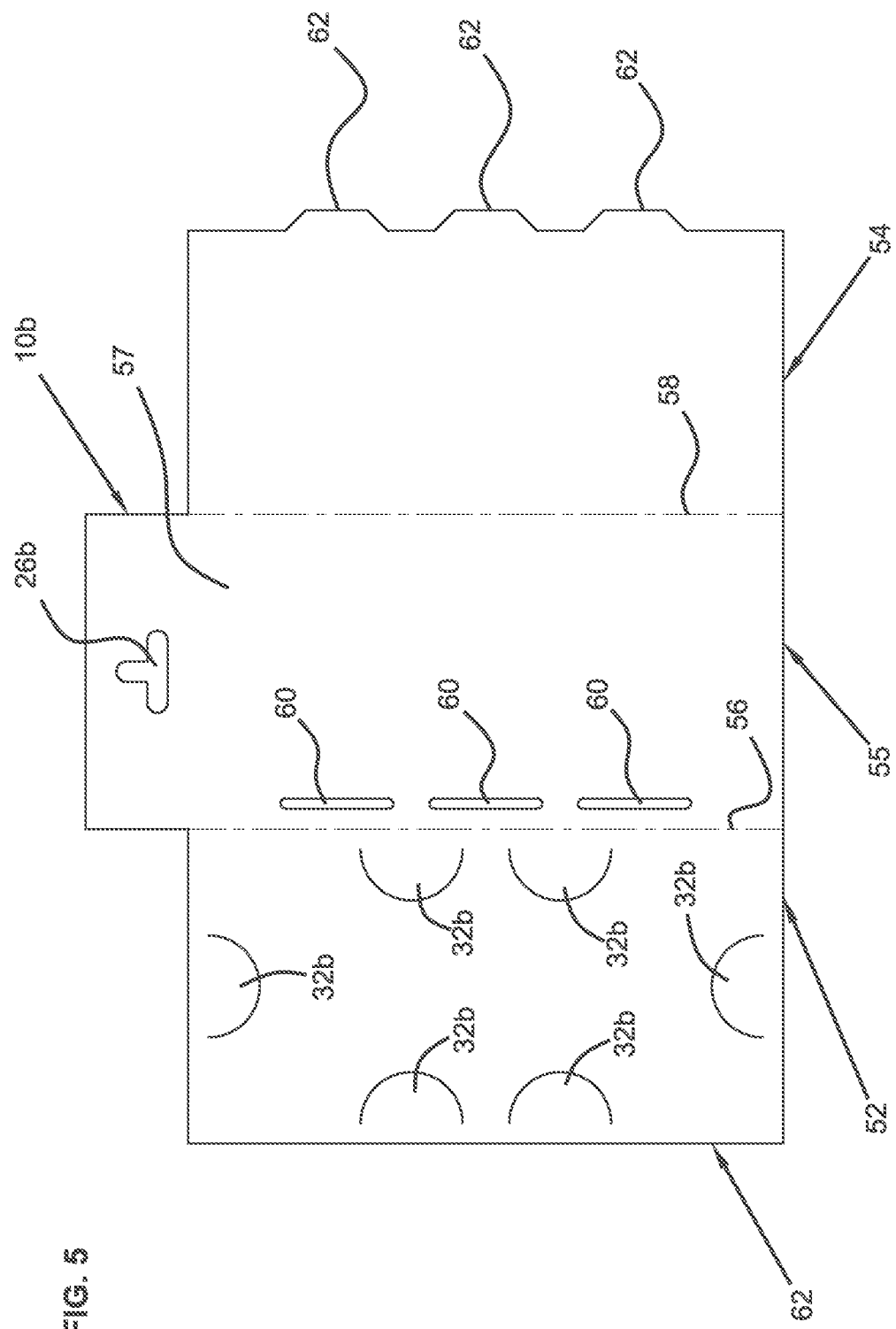
FIGS. 5-7 are top views of another example of a flexible, film-like substrate in accordance with the principles of the present disclosure in various folding stages.
Figure 6:
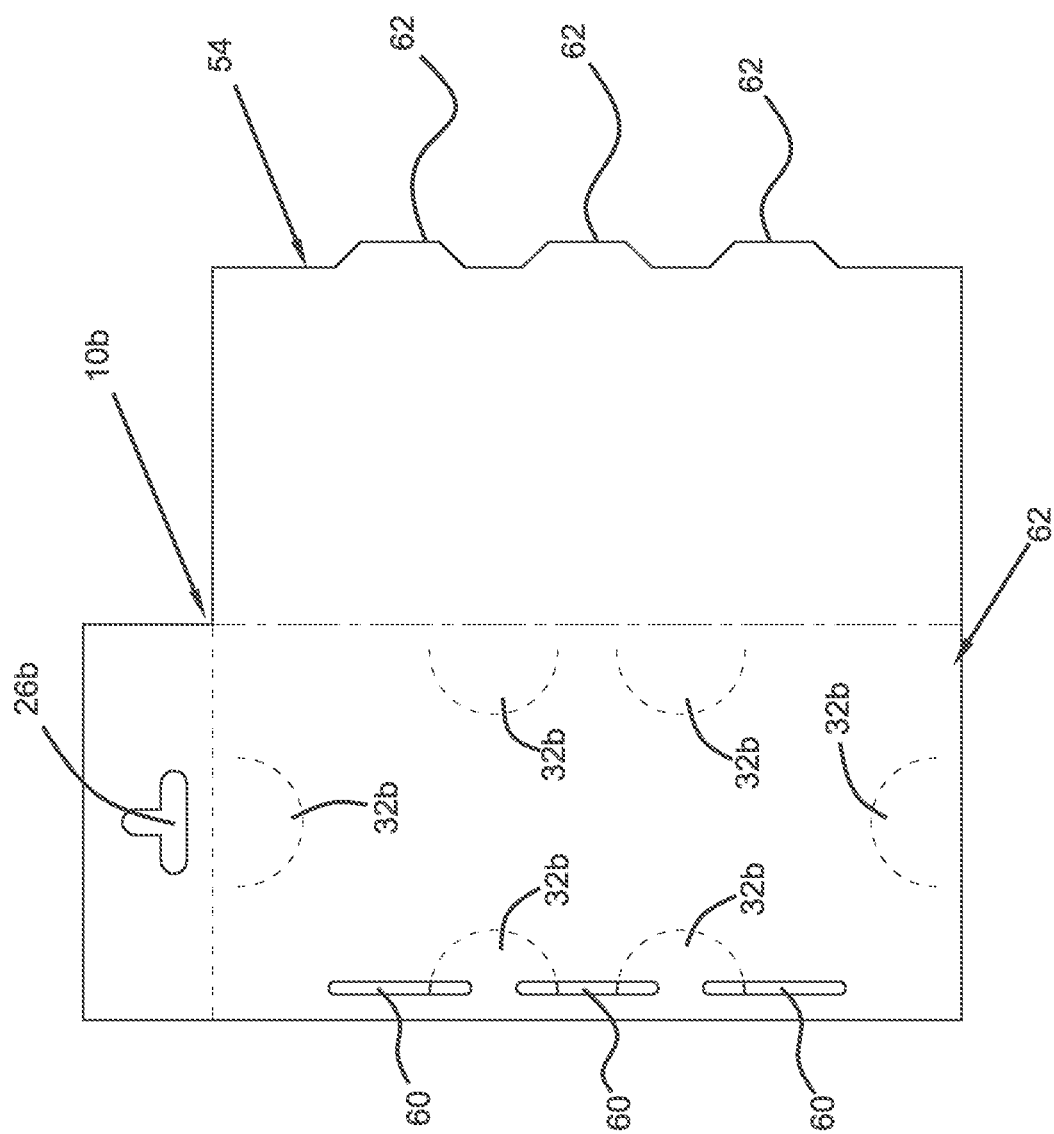
Figure 7:
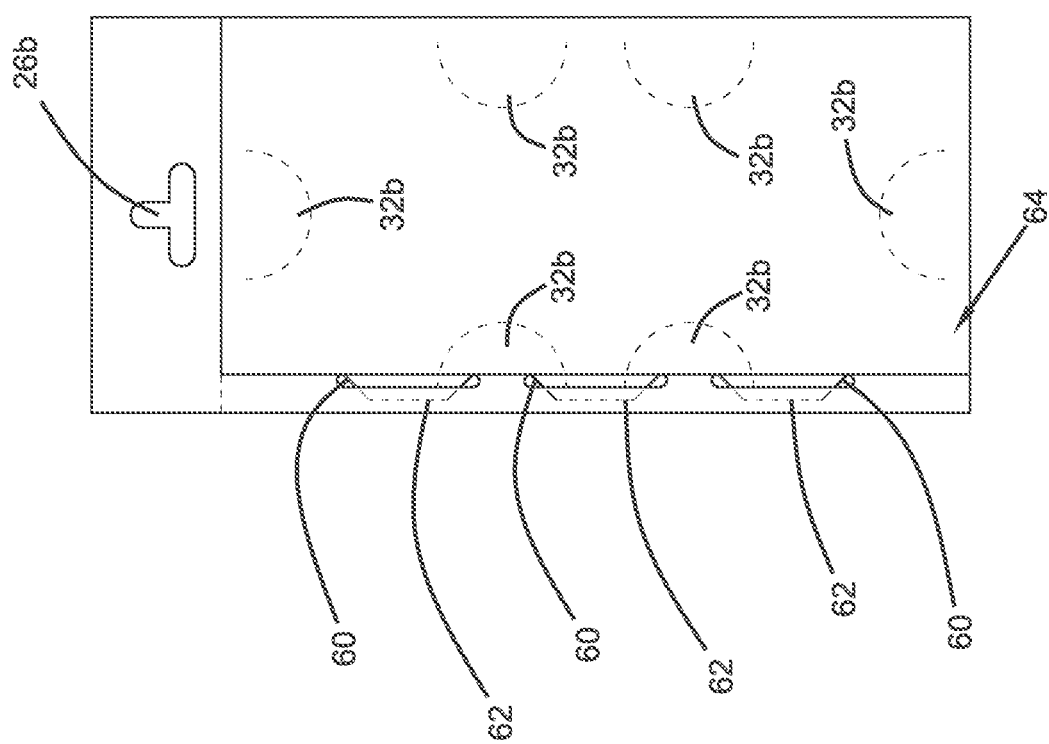

Turning to FIGS. 5-7, another example, flexible, film-like substrate 10b is depicted with first, second, and third integral panels 52, 54, 55. The third panel 55 or middle panel can be a region adapted for fixed fiber routing where optical fiber is typically adhesively secured to the flexible, film-like substrate 10b. The first, second, and third panels 52, 54, 55 can be foldably joined together along first and second longitudinal fold lines 56, 58. The first and second panels 52, 54 can be a Mylar™, in accordance with the present disclosure. That is, the first and second panels 52, 54 can optionally be a planar flexible substrate layer without the adhesive. Thus, the first and second panels 52, 54 optionally may have a different thickness compared to the third panel 55 including the first planar flexible substrate layer 12, an adhesive layer 14, and the second planar flexible substrate layer 16. The flexible, film-like substrate 10b can be arranged and configured to hold optical fibers in a fixed routing path (e.g., at the third panel). The flexible, film-like substrate 10b may have openings 60 (e.g., slits) adjacent the first longitudinal fold line 56 for attaching the second panel 54.

The first panel 52 can include a plurality of the optical fiber management structures 32b for managing loose optical fibers. The first panel 52 can be folded at the first longitudinal fold line 56 to be disposed overlaying and parallel relative to the third panel 55. That is, the first panel 52 can be folded under the third panel 55 such that the first panel 52 is parallel to and opposes a bottom side of the third panel 55. The first panel 52 can be configured for loose fiber routing, storage, and/or management.

The second panel 54 may include tab members 62 (e.g., hooks) that act as latches. The tab members 62 can be received in the openings 60 of the flexible, film-like substrate 10b such that the second panel 54 cooperates with a top side 57 of the third panel 55 to form a sleeve 64 for storing any loose optical fibers in the sleeve-like space between the folded third panel 55 and the folded second panel 54. That is, the second panel 54 can be folded over the third panel 55 such that the second panel 54 is parallel to and opposes the top side 57 of the third panel 55. The second panel 54 can be folded as described to create a pocket/sleeve-like space to store, route, manage loose optical fiber between the top side 57 of the third panel 55 and the second panel 54. The flexible, film-like substrate 10b may include a mounting structure 26b integral with the flexible, film-like substrate 10b for mounting the flexible, film-like substrate 10b to a wall, enclosure, module, or other telecommunications equipment.

In certain examples, the optical fiber management structure 32b can be arranged and configured as a cover that forms a sleeve for storing optical fibers. In certain examples, the first and second panels 52, 54 may remain in a flat configuration and not be folded along respective first and second longitudinal fold lines 56, 58.

Figure 8:
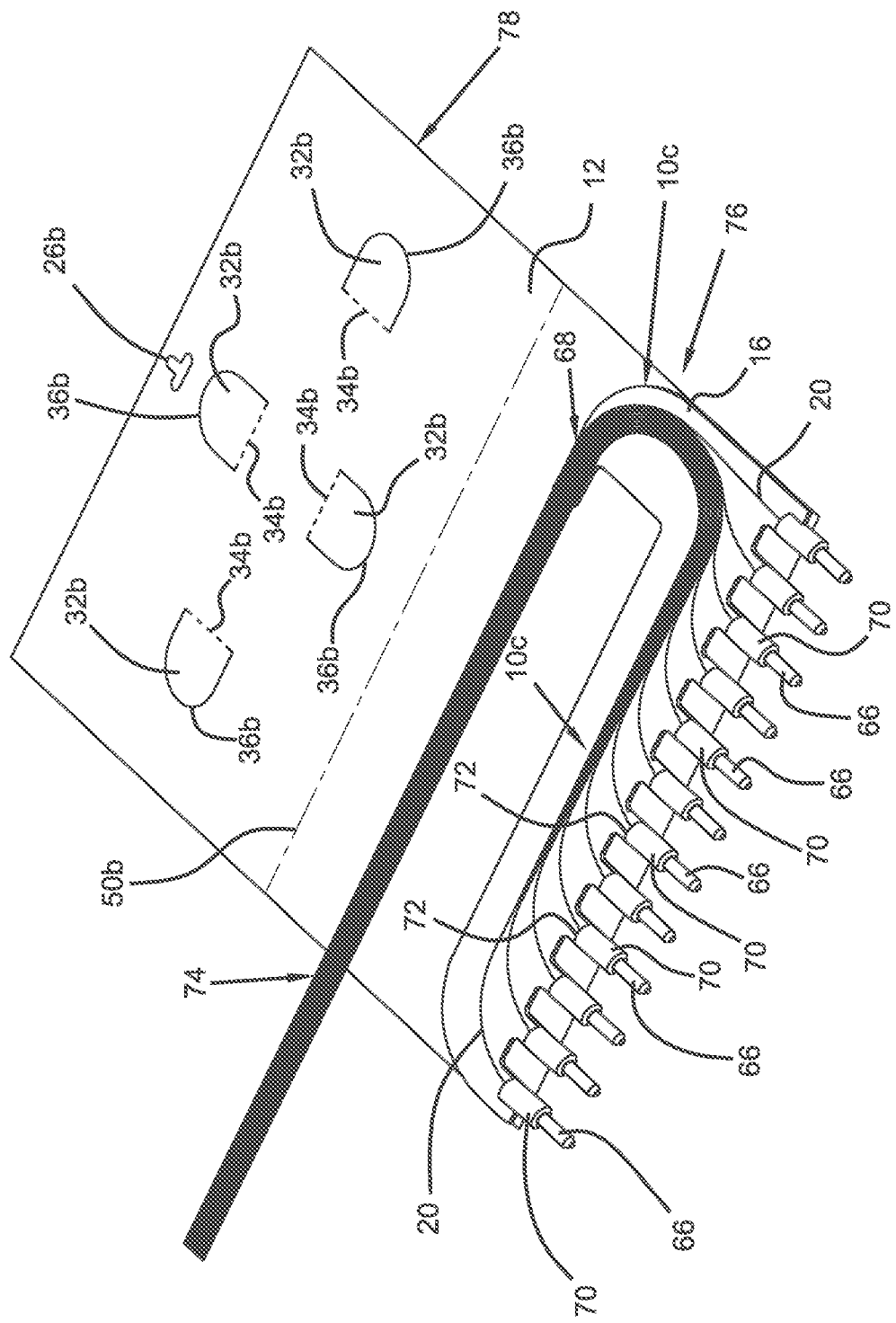
FIG. 8 is a top, front, perspective view of a further example of a flexible, film-like substrate in accordance with the principles of the present disclosure.

FIG. 8 is a partial top, front, perspective view of a further example of a flexible, film-like substrate 10c in accordance with the present disclosure. The flexible film-like substrate 10c includes routed optical fibers 20. The optical fibers are terminated in ferrules 66. In certain examples, the routed optical fibers 20 can form a ribbon cable 68. In this example, the ferrules 66 include ferrule hubs 70. Each ferrule hub 70 defines a notch or cutout for receiving front portions of front extensions 72 of the flexible, film-like substrate 10c. The row of ferrules 66 can be mated with connectors. Loose, unfixed ends of the optical fibers 20 can be managed on non-adhesive portions, base layer 12 of the flexible, film-like substrate 10c. The loose, unfixed ends can extend past the outer boundary of the flexible, film-like substrate 10c. In certain examples, the base layer 12 may include management tabs 32b for routing the loose, unfixed ends of the optical fibers 20 in a coil, although alternatives are possible. The management tabs 32b can be fixed at a first end 34b and unattached at the other second end 36b for routing optical fibers underneath. As such, fibers can be routed under and inside the management tabs 32b. In other examples, the management tabs 32b can be configured for fibers to be routed under and around the management tabs 32b. The flexible, film-like substrate 10c may include a fold line 50b (e.g., a perforated lien, scored line, crease or other structure for a defining fold location) to divide the flexible, film-like substrate 10c into first and second flexible portions 76, 78. The first flexible portion 76 can provide fixed fiber management. The second flexible portion 78 may optionally provide splice mounting capability.

Mounting structure 26b integral with the flexible, film-like substrate 10c may be used for mounting the flexible, film-like substrate 10c to a wall, enclosure, module, or other telecommunications equipment.

Figure 9:
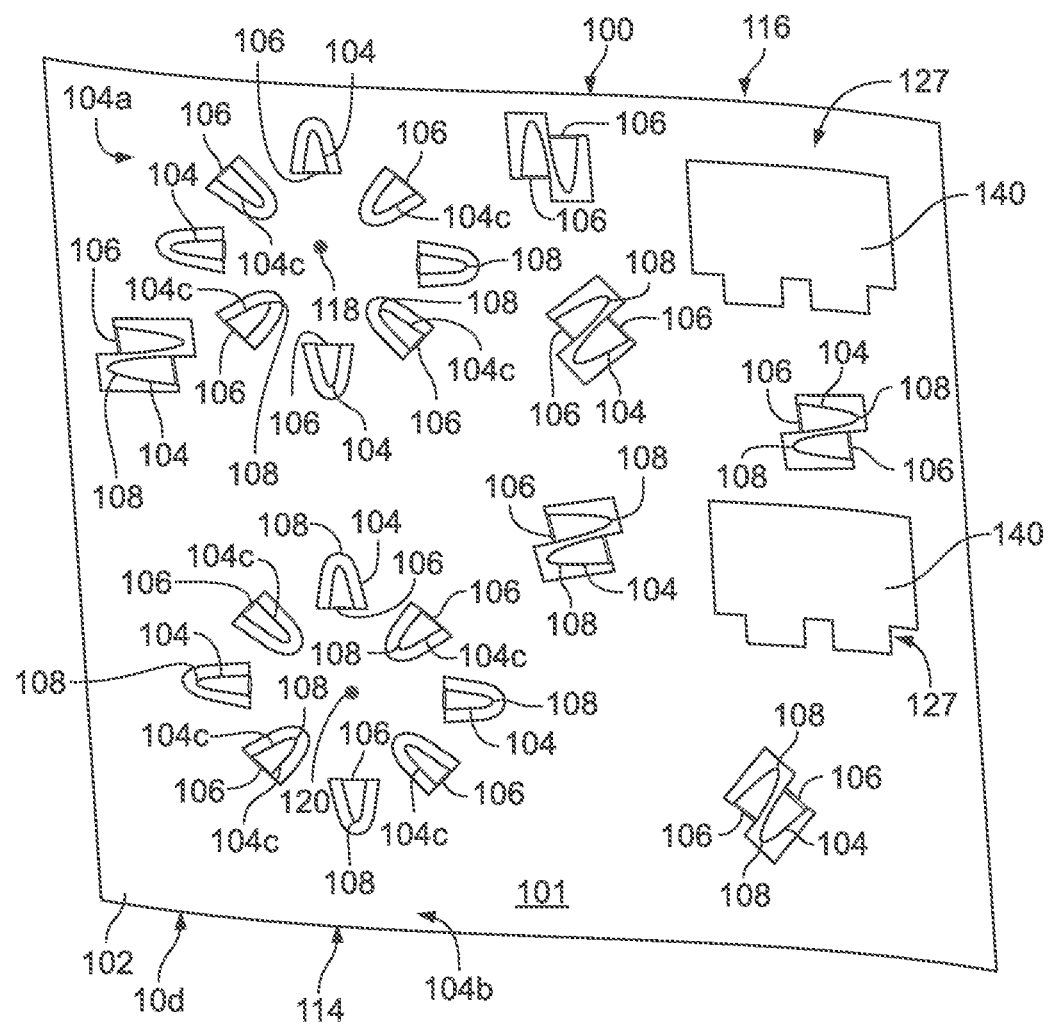
FIG. 9 is a top, schematic view of a further example of a flexible, film-like substrate including fiber management tabs in accordance with the principles of the present disclosure.
Figure 10:
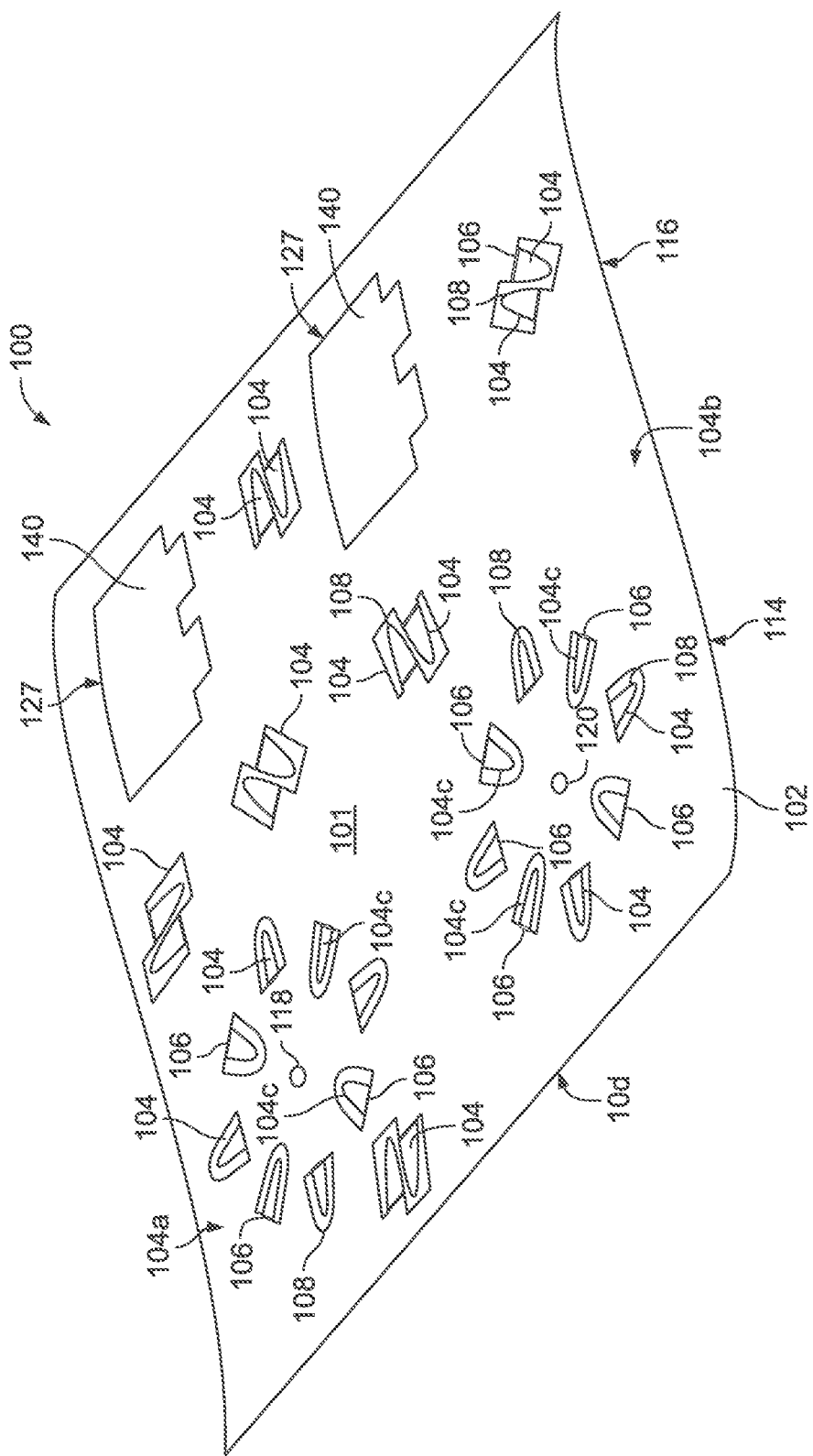
FIG. 10 is a perspective view of the flexible, film-like substrate of FIG. 9.

FIGS. 9-10 are schematic views of another example flexible, film-like substrate 10d to form a telecommunications fiber management device 100 in accordance with the present disclosure. The flexible, film-like substrate 10d can be a single-layer substrate that includes a planar flexible substrate layer 101 (e.g., a polymeric layer such as Mylar™ layer).

In certain examples, the flexible, film-like substrate 10d may include a multi-layer substrate that can include a first planar flexible substrate layer (e.g., base substrate layer, bottom substrate layer, bulk substrate), an adhesive layer (e.g., epoxy), and an optional second planar flexible substrate layer (e.g., top substrate layer) in accordance with the principles of the present disclosure, although alternatives are possible.

The flexible, film-like substrate 10d can include a main body 102 and a plurality of fiber management tabs 104. The plurality of fiber management tabs 104 include base ends 106 that may be unitarily/integrally formed with the main body 102 and free ends 108 that are positioned opposite from the base ends 106. The free ends 108 can create a flap or folding tab. In other words, the plurality of fiber management tabs 104 can be fixed at the base ends 106 and unattached at the free ends 108 for routing optical fibers 20 underneath.

Figure 11:
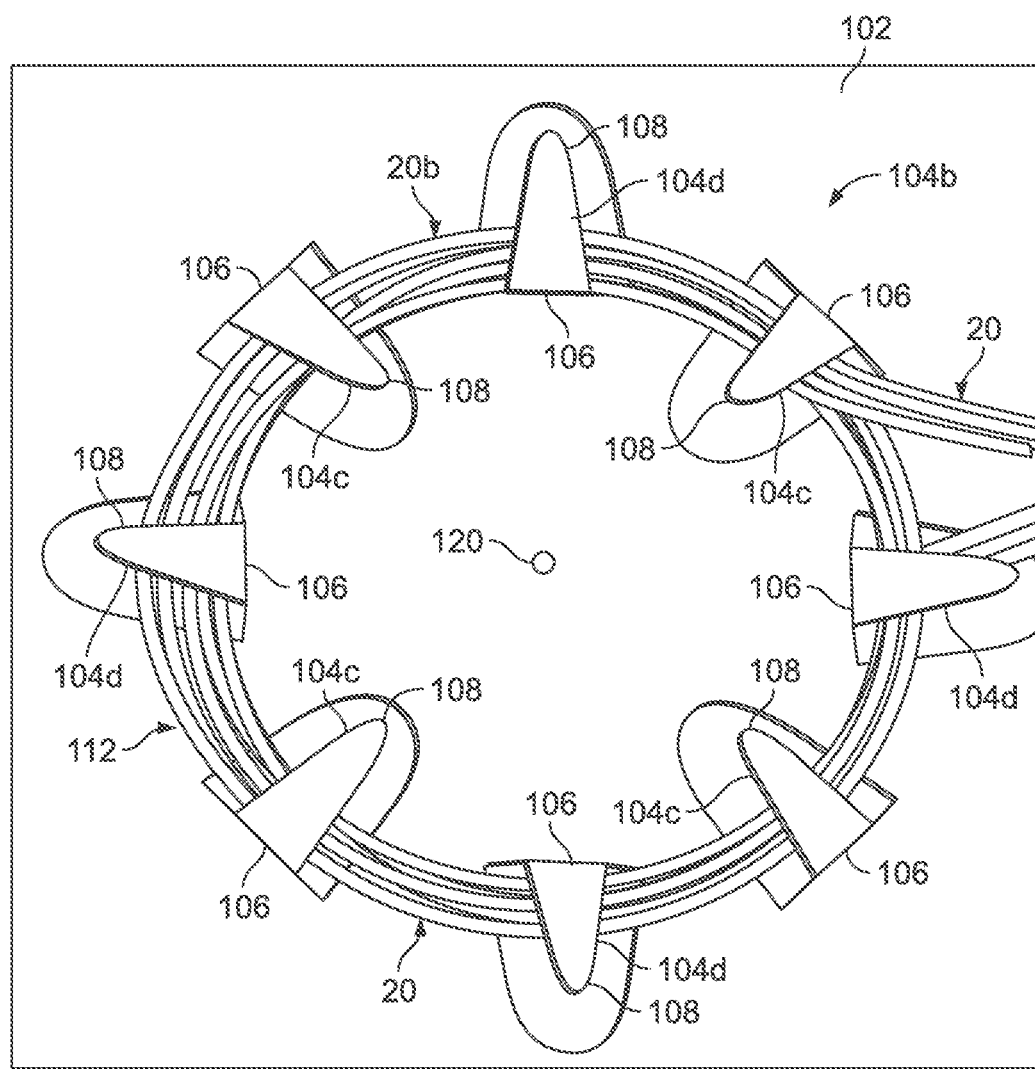
FIG. 11 is an enlarged view of a portion of the flexible, film-like substrate of FIG. 9.
Figure 12:
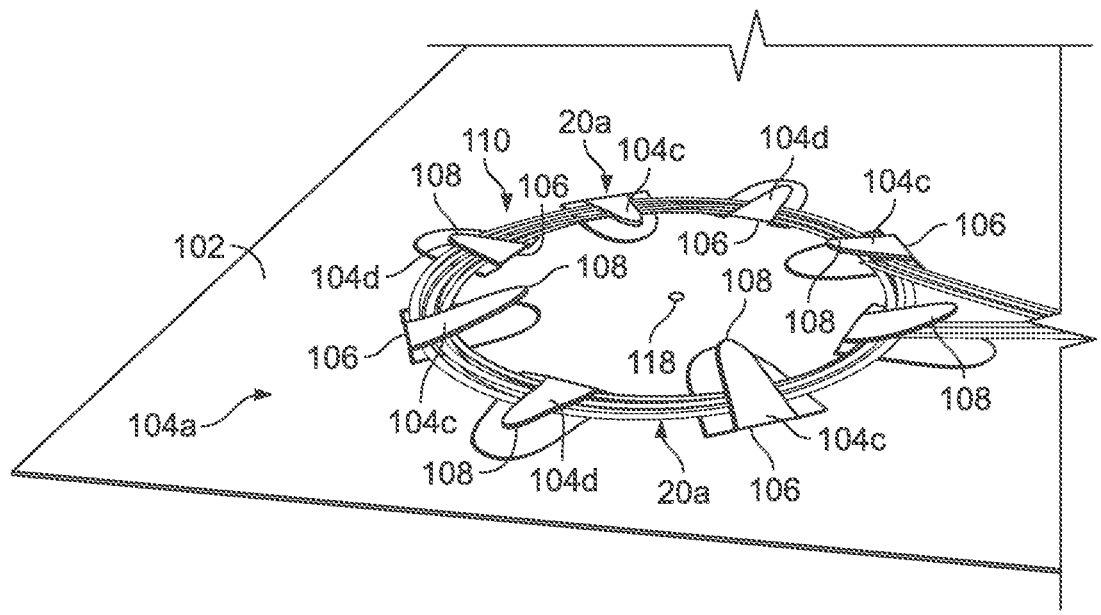
FIG. 12 is an enlarged perspective view of a portion of the flexible, film-like substrate of FIG. 9.
Figure 13:
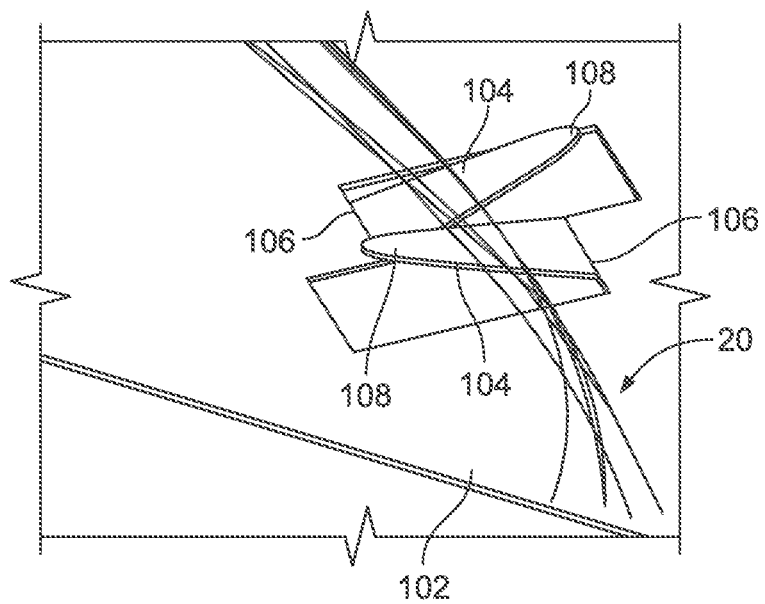
FIG. 13 is an enlarged perspective view of a portion of the flexible, film-like substrate of FIG. 9 showing fiber management tabs in accordance with the principles of the present disclosure.

Turning to FIGS. 11-13, the plurality of fiber management tabs 104 can be used for storing lengths of optical fibers 20 loosely constrained on the flexible, film-like substrate 10d. That is, the plurality of fiber management tabs 104 can be used to manage optical fibers 20 that are not adhesively attached. The plurality of fiber management tabs 104 may be flexed up to route loose, unfixed ends of optical fibers 20 underneath.

The plurality of fiber management tabs 104 may include a first set 104a and a second set 104b, although alternatives are possible. The first set 104a of the plurality of fiber management tabs 104 can be arranged in a first configuration for securing a first optical fiber 20a to the flexible, film-like substrate 10d in a first coil 110 (e.g., first coil portion). In certain examples, there may be a first plurality of optical fibers 20a arranged on and managed by the flexible, film-like substrate 10d.

In some examples, the second set 104b of the plurality of fiber management tabs 104 can be arranged in a second configuration for securing a second optical fiber 20b to the flexible, film-like substrate 10d in a second coil 112 (e.g., second coil portion). In certain examples, there may be a second plurality of optical fibers 20b arranged on and managed by the flexible, film-like substrate 10d.

The plurality of fiber management tabs 104 may allow optical fibers 20 to be coiled or wrapped at an appropriate bend radius for the optical fiber. The plurality of fiber management tabs 104 can be used to store and retain the optical fibers 20 and help prevent displacement of the optical fibers 20. Of course, in alternative embodiments, the flexible, film-like substrate 10d can comprise other structural elements, to manage optical fibers, as would be apparent to one of ordinary skill.

The plurality of fiber management tabs 104 of the flexible, film-like substrate 10d can be cut to any desired shape and/or sizes. In the example depicted, the plurality of fiber management tabs 104 are triangular in shape, although alternatives are possible. The plurality of fiber management tabs 104 can be created in any shape or size by a cutting process, for example. The plurality of fiber management tabs 104 can take the shape of a circle, an oval, or an ellipse, although alternatives are possible. In certain examples, the plurality of fiber management tabs 104 can be semi-circular in shape, although alternatives are possible. The cutting process can be accomplished by any known cutting techniques. In certain examples, any known arrangements, operations, controlling machines or devices for cutting, cutting-out, stamping out, punching, perforating and also for severing may be used.

In certain examples, the flexible, film-like substrate 10d can include a first section 114 and a second section 116 (see FIG. 9). At least some of the plurality of fiber management tabs 104 can be provided at each of the first and second sections 114, 116, although alternatives are possible. In certain examples, the first and second coils 110, 112 can be secured to the first section 114 of the flexible, film-like substrate 10d, although alternatives are possible. In other examples, the first and second coils 110, 112 can be secured to the second section 116 of the flexible, film-like substrate 10d, although alternatives are possible. As shown, optical fibers 20 can be routed under and inside the plurality of fiber management tabs 104. In other examples, the plurality of fiber management tabs 104 can be configured for optical fibers 20 to be routed under and around the plurality of fiber management tabs 104. Although eight fiber management tabs 104 are depicted for each of the first and second sets 104a, 104b of the plurality of fiber management tabs 104, any number of fiber management tabs 104 may be formed thereon and in any shape.

In certain examples, the first and second sets 104a, 104b of the plurality of fiber management tabs 104 can be positioned circumferentially about respective first and second reference points 118, 120. That is, the plurality of fiber management tabs 104 of the first set 104a of the plurality of fiber management tabs 104 can be positioned circumferentially about the first reference point 118 and the plurality of fiber management tabs 104 of the second set 104b of the plurality of fiber management tabs 104 can be positioned circumferentially about the second reference point 120. The first and second sets 104a, 104b of the plurality of fiber management tabs 104 can each include first fiber management tabs 104c in which the free ends 108 face towards the respective first and second reference points 118, 120 and second fiber management tabs 104d in which the free ends 108 face away from the respective first and second reference points 118, 120.

The plurality of fiber management tabs 104 are capable of being resiliently flexed relative to the main body 102 from an at rest position (see FIGS. 9-10) to a flexed position (see FIGS. 11-13). When in the at rest position, the plurality of fiber management tabs 104 can be co-planar with the main body 102. When in the flexed position, the free ends 108 of the plurality of fiber management tabs 104 can be upwardly offset from the main body 102 such that an optical fiber 20 can be inserted beneath the plurality of fiber management tabs 104 and secured between the plurality of fiber management tabs 104 and the main body 102.

In certain examples, the first coil 110 of the first optical fiber 20a can be secured to the flexible, film-like substrate 10d by the first set 104a of the plurality of fiber management tabs 104. In some examples, the first optical fibers 20a that includes the first coil 110 can be secured to the first section 114 of the flexible, film-like substrate 10d by the first set 104a of the fiber management tabs 104.

In certain examples, the second coil 112 of the second optical fiber 20b can be secured to the flexible, film-like substrate 10d by the second set 104b of the plurality of fiber management tabs 104. In some examples, the second optic fibers 20b that includes the second coil 112 can be secured to the first section 114 of the flexible, film-like substrate 10d by the second set 104b of the fiber management tabs 104.

Figure 14:
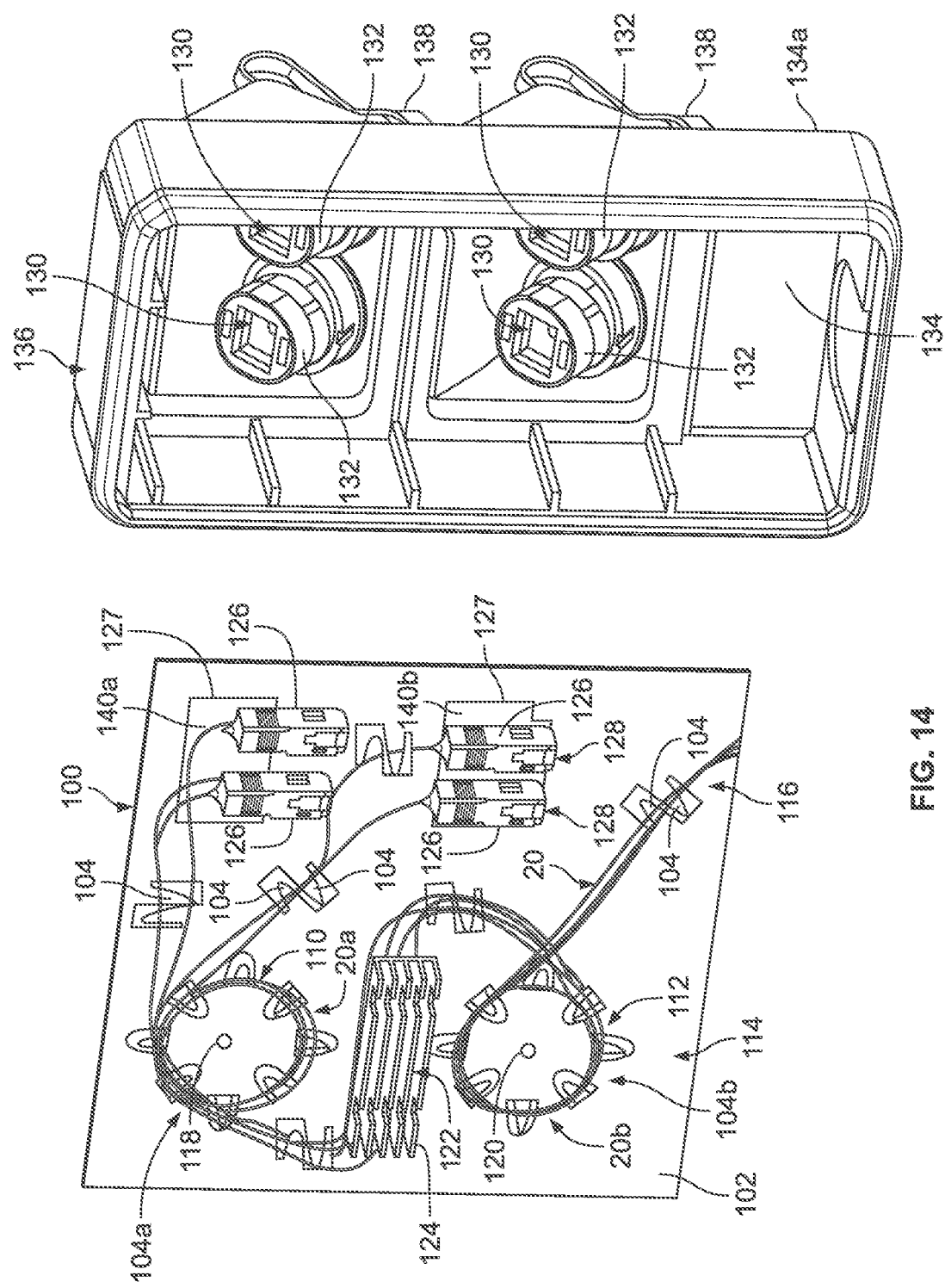
FIG. 14 is a schematic perspective view of the flexible, film-like substrate to form a telecommunications fiber management device in accordance with the principles of the present disclosure and also an example enclosure housing piece.
Figure 15:
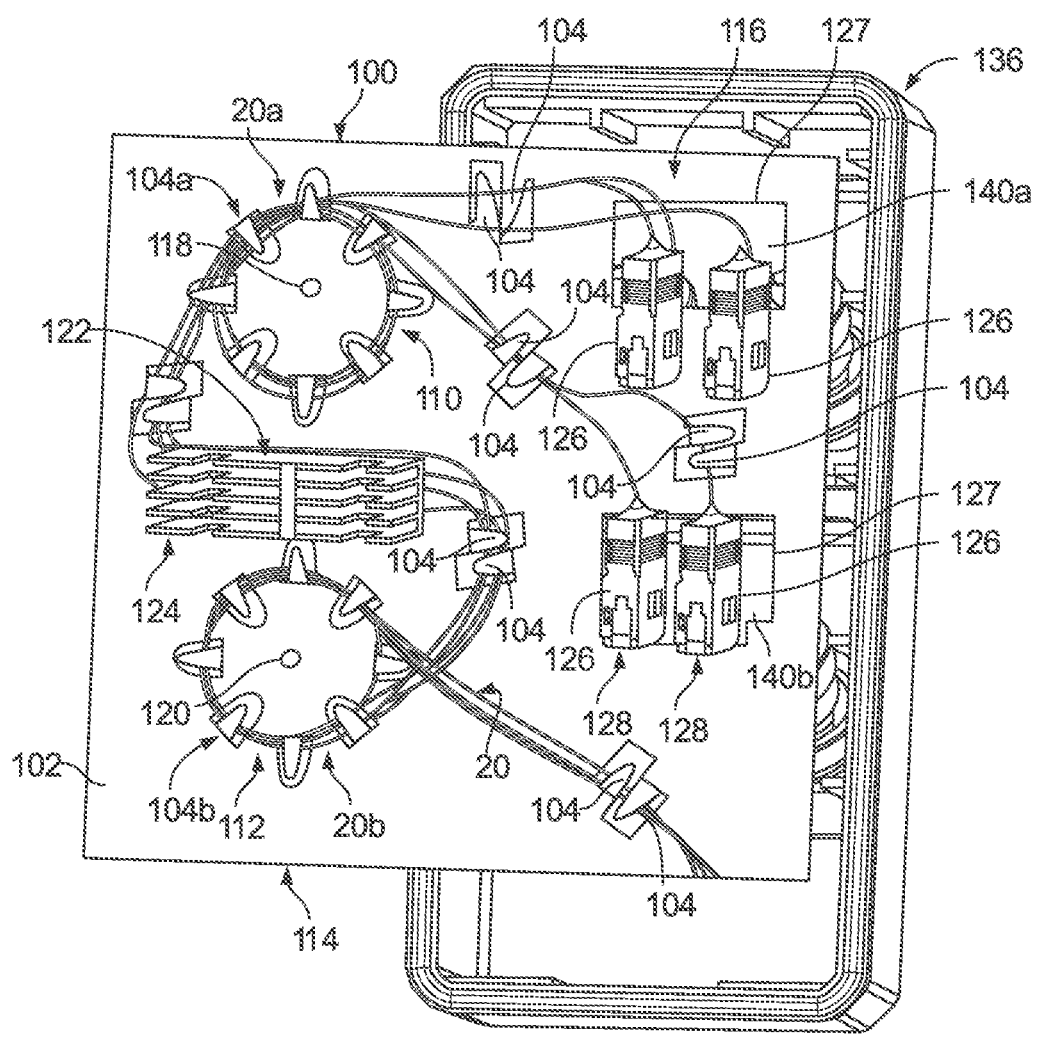
FIG. 15 is a top, schematic view of the flexible, film-like substrate in a first state that is generally planar.

In certain examples, optical fibers 20 of the first plurality of optical fibers 20a can extend from the first section 114 to the second section 116 as shown in FIGS. 14-15. The plurality of fiber management tabs 104 can be adapted to secure the optical fibers 20 of the first plurality of optical fibers 20a to the second section 116. That is, the first optical fiber 20a can extend from the first section 114 to the second section 116 where at least one of the plurality of fiber management tabs 104 secures the first optical fiber 20a to the second section 116.

In certain examples, the optical fiber 20 can include a first portion and a second portion where the first portion is not adhesively secured to the flexible, film-like substrate 10d. The first portion can be secured to the flexible, film-like substrate 10d by the plurality of fiber management tabs 104 and the second portion can be adhesively secured to the flexible, film-like substrate 10d, although alternatives are possible.

Turning to FIGS. 14-15, the first and second optical fibers 20a, 20b can be secured together at a splice location 122. In certain examples, the first and second pluralities of optical fibers 20a, 20b can be secured together at the splice location 122. The splice location 122 can be supported by a splice holder 124. The splice holder 124 can be secured to the main body 102 of the flexible, film-like substrate 10d (e.g., by adhesive, mounting tabs defined by the substrate 10d, etc.), although alternatives are possible. The splice holder 124 and the first and second coils 110, 112 can be secured to the first section 114 of the flexible, film-like substrate 10d, although alternatives are possible. In certain examples, the first and second optic fibers 20a, 20b can be spliced together at the splice locations 122 supported by the splice holder 124 attached to the first section 114. When the first and second optical fibers 20a, 20b are spliced together, a certain amount of length of the first and second optical fibers 20a, 20b can be stored about the first and second coils 110, 112.

The telecommunications fiber management device 100 can be adapted for use with a telecommunications enclosure 136 (e.g., closure, organizer). The telecommunications enclosure 136 can include a housing 134. The housing 134 may have a first housing piece 134a (e.g., cover, top) and a second housing piece 134b (e.g., base, bottom) (not shown).

The telecommunications fiber management device 100 can include connector portions 127 defined in the main body 102 of the flexible, film-like substrate 10d. Fiber optic connectors 126 can be received in the connector portions 127 of the flexible, film-like substrate 10d. The connector portions 127 can be defined in the second section 116 of the flexible, film-like substrate 10d, although alternatives are possible.

The first optical fibers 20a can each be terminated by one of the fiber optic connectors 126. The first optical fibers 20a can each have connectorized ends 128 that are adjacent the second section 116. The connectorized ends 128 can plug into non-hardened connector ports 130 of fiber optic adapters 132 that are secured to the first housing piece 134a of the telecommunications enclosure 136.

In certain examples, the fiber optic adapters 132 are ruggedized fiber optic adapters that include hardened connector ports 138 accessible from outside the first housing piece 134a and the non-hardened connector ports 130 accessible from inside the housing 134.

In certain examples, the second section 116 of the flexible, film-like substrate 10d defines at least one opening 140 for allowing the first optical fibers 20a to pass through the flexible, film-like substrate 10d to reach the non-hardened connector ports 130. For example, the at least one opening 140 can be defined at the connector portions 127 of the flexible, film-like substrate 10d for routing the connectorized ends 128 therethrough.

Figure 16:
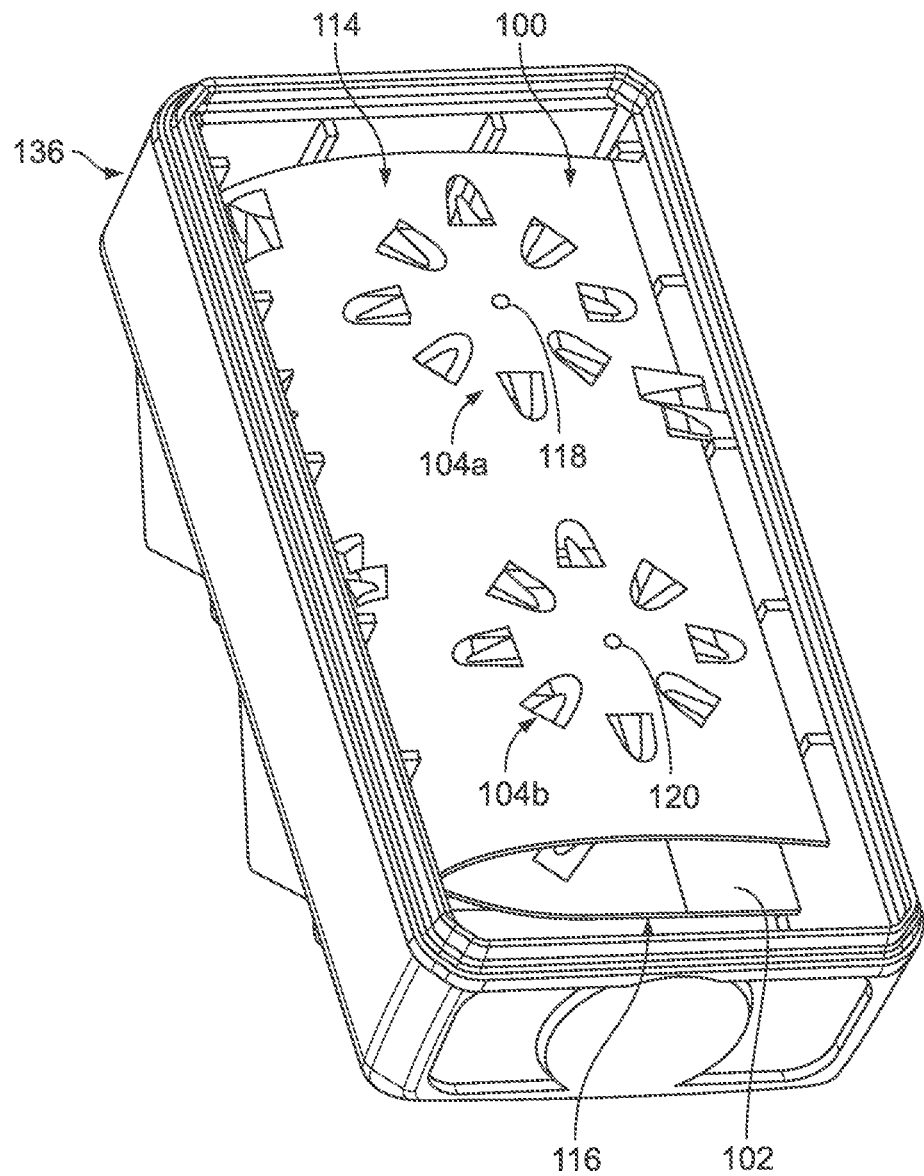
FIG. 16 is a perspective, schematic view of the flexible, film-like substrate in a second state positioned in the enclosure housing piece of FIG. 14.

The main body 102 of the flexible, film-like substrate 10d can be movable between a first state (see FIG. 15) in which the first and second sections 114, 116 are generally planar and a second state (see FIG. 16) in which the first and second sections 114, 116 generally oppose one another. When the telecommunications fiber management device 100 is mounted within the telecommunications enclosure 136, the telecommunications fiber management device 100 is oriented in the second state. That is, the flexible, film-like substrate 10d can be mountable in the housing 134 and be oriented in the second state when in the housing 134. In certain examples, the flexible, film-like substrate 10d may be oriented in the second state where a gentle bend (e.g., gentle curve, rolled, not folded) (see FIG. 16) of the flexible, film-like substrate 10d is obtained to provide bend radius protection for the first and second optical fibers 20a, 20b. The flexible, film-like substrate 10d can be bent or flexed to support the optical fibers 20a, 20b without creating a fold.

In certain examples, the second section 116 includes first and second openings 140a, 140b for allowing the spliced first optical fibers 20a to respectively pass through the flexible, film-like substrate 10d to reach the non-hardened connector ports 130. That is, the connectorized ends 128 of the spliced first optical fibers 20a can be respectively routed through the openings 140a, 140b of the film-like substrate 10d to plug into the non-hardened connector ports 130 of fiber optic adapters 132.

Another aspect of the present disclosure relates to a fixture 142 (e.g., jig, fixation device) (see FIG. 17) for use in loading the optical fibers 20 into the telecommunications fiber management device 100. The fixture 142 may include a first member 141 and a second member 143, although alternatives are possible.

Figure 17:
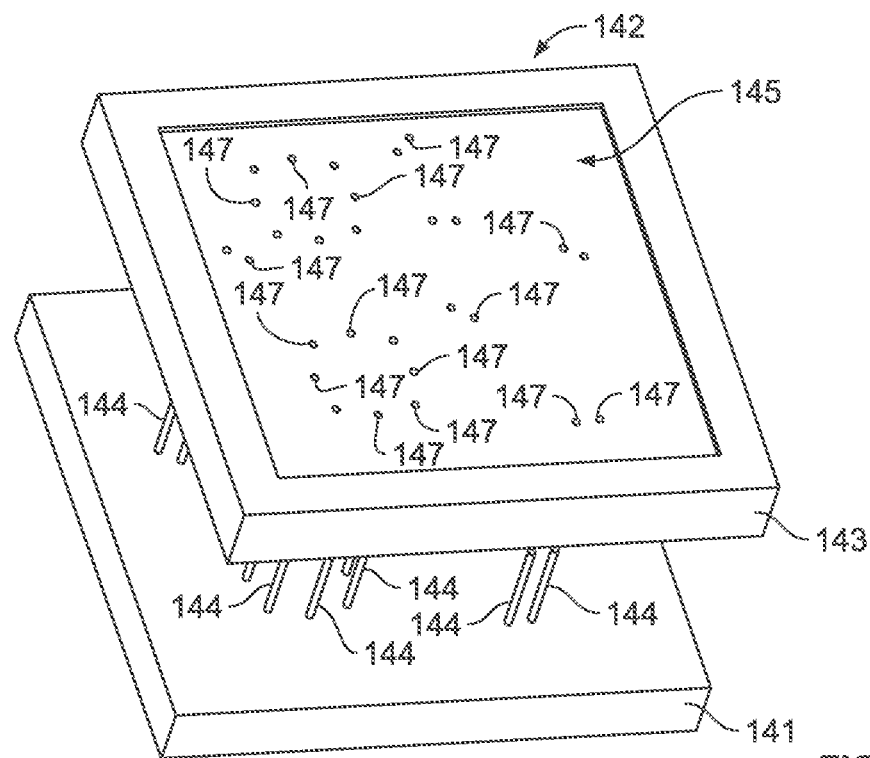
FIG. 17 is a perspective schematic view of an example guide fixture including exploded first and second parts in accordance with the principles of the present disclosure.
Figure 18:
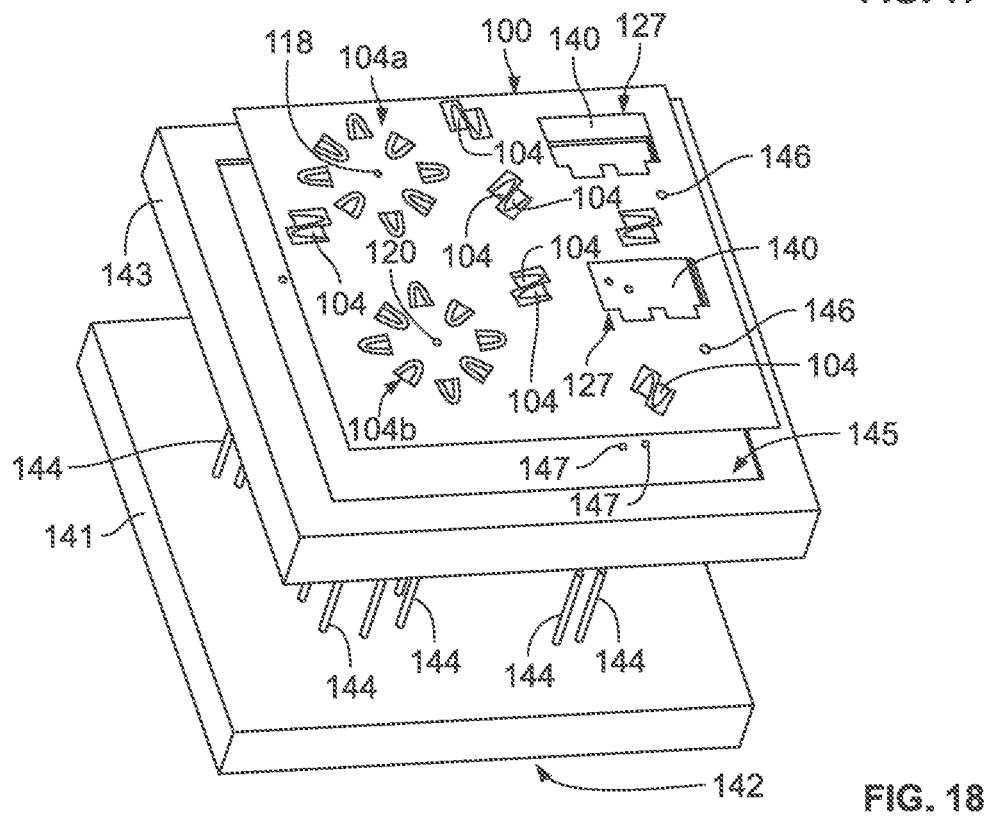
FIG. 18 is a perspective schematic view of the guide fixture shown in FIG. 17 and the flexible, film-like structure of FIG. 9 exploded therefrom.

Turning to FIGS. 17-18, the second member 143 of the fixture 142 may define a recess 145 sized and configured to receive the telecommunications fiber management device 100. The telecommunications fiber management device 100 can be mounted in the recess 145 of the fixture 142 while in the first state.

The first member 141 of the fixture 142 can include posts 144 (e.g., supports) and the second member 143 may define a plurality of apertures 147 (e.g., openings, holes). When the first and second members 141, 143 are mounted together as the fixture 142, the posts 144 can be arranged and configured to be received in one of the plurality of apertures 147.

Figure 19:
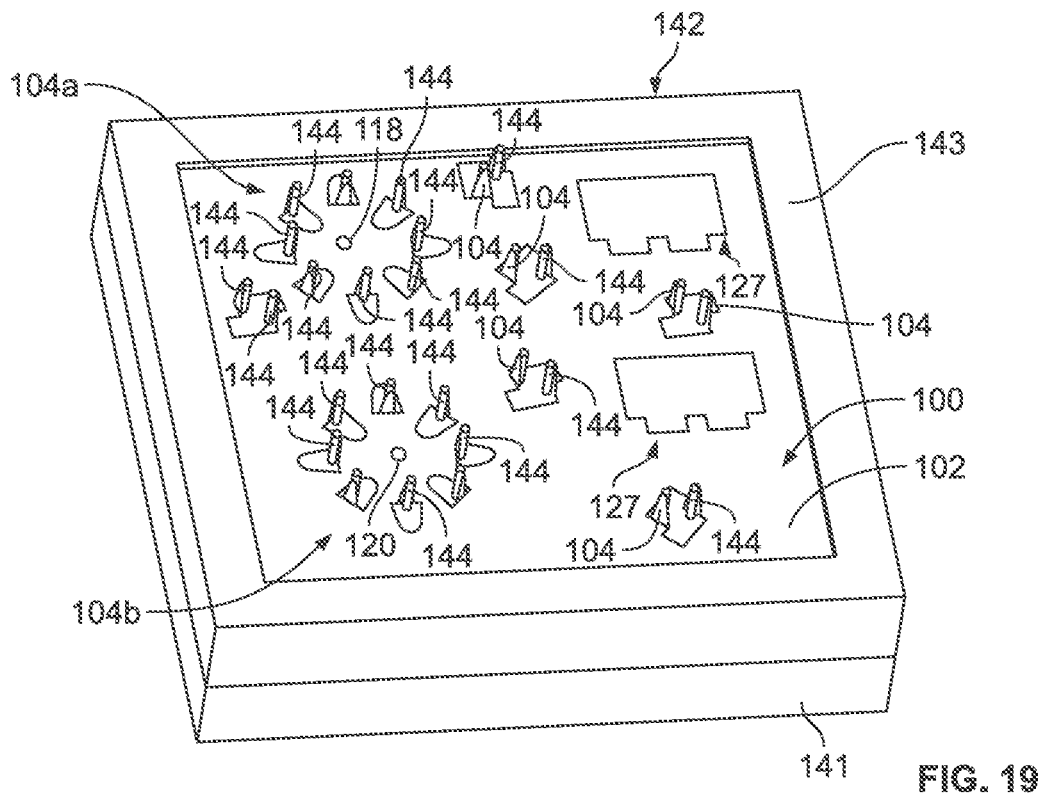
FIG. 19 is a perspective view of the guide fixture of FIG. 18 with the first and second parts mounted together and the flexible, film-like structure positioned in the second part.
Figure 20:
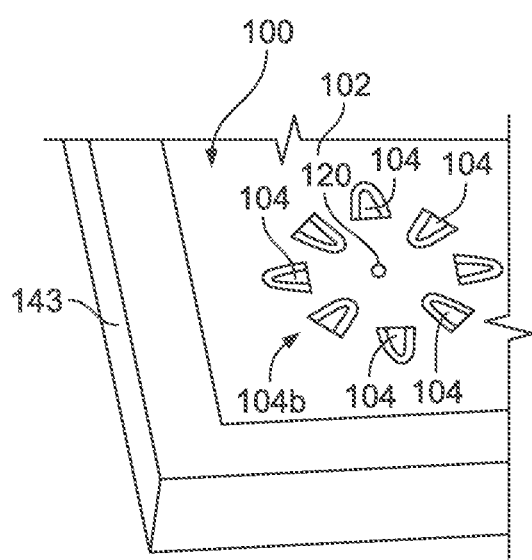
FIG. 20 is an enlarged view of a portion of the second part including the flexible, film-like structure of FIG. 19.
Figure 21:
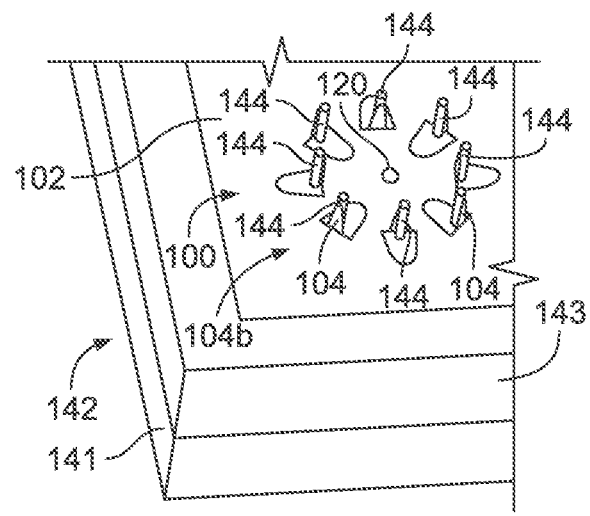
FIG. 21 is an enlarged view of a portion of the guide fixture and the flexible, film-like structure of FIG. 19.

Referring to FIGS. 19-21, the posts 144 can be moveable between first positions in which the posts 144 can be extended through the apertures 147 to hold the fiber management tabs 104 in the flexed positions to facilitate loading the optical fibers 20 under the fiber management tabs 104, and second positions in which the posts 144 can be retracted to allow the fiber management tabs 104 to move back toward the at rest positions.

In certain examples, the post 144 can be moved or activated manually, although alternatives are possible. In certain examples, the post 144 can be moved or activated automatically, although alternatives are possible.

In certain examples, the flexible, film-like substrate 10d may include mounting structures 146 (e.g., fixation holes, openings, apertures, notch) that can be used to mount the flexible, film-like substrate 10d to the fixture 142 for alignment control and support during assembly. The mounting structures 146 can be defined by the flexible, film-like substrate 10d such that they are integrally made with (e.g., formed in one seamless piece with) the flexible, film-like substrate 10d.

Figure 22:
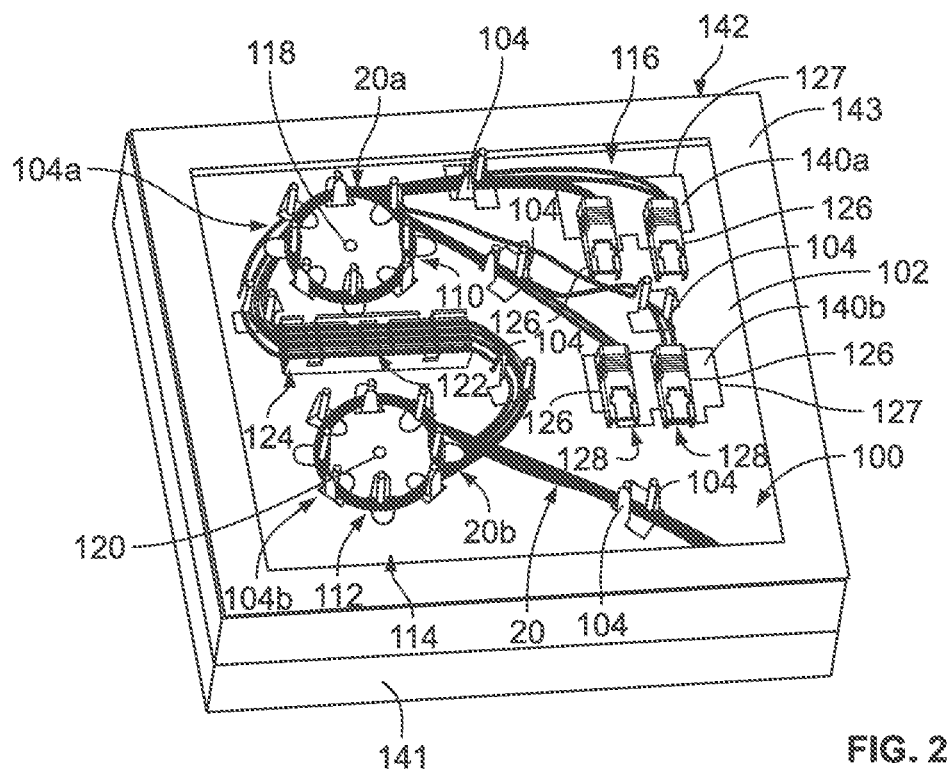
FIG. 22 is a perspective, schematic view of the guide fixture and the telecommunications fiber management device of FIG. 14.
Figure 23:
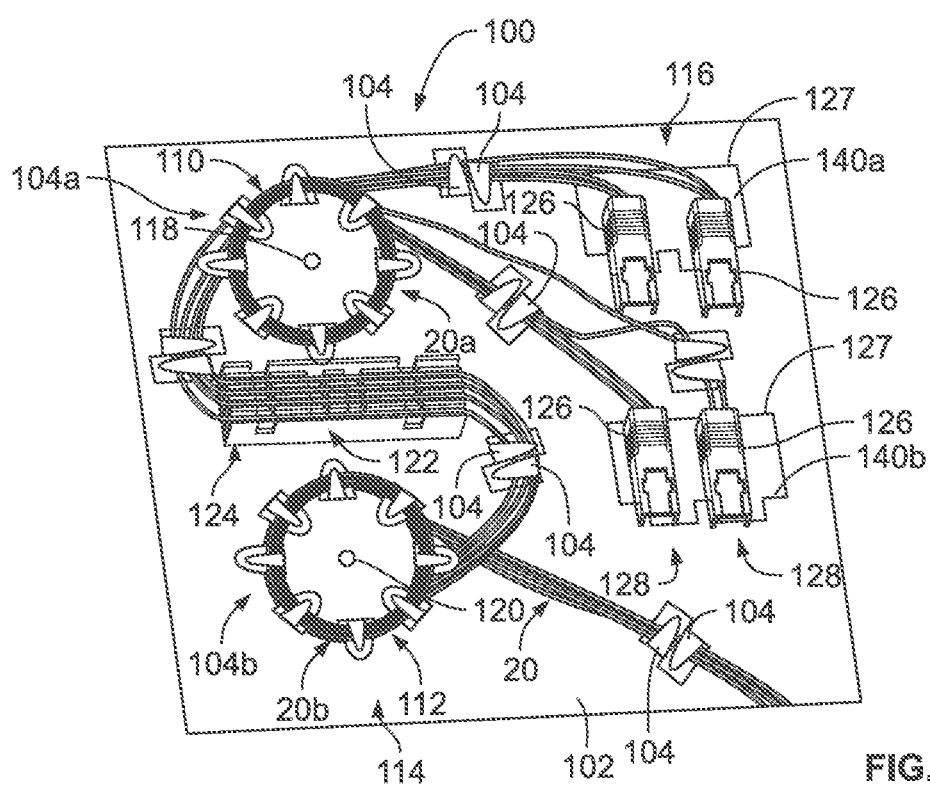
FIG. 23 is a perspective, schematic view of the telecommunications fiber management device of FIG. 22 removed from the guide fixture.

Turning to FIG. 22, the flexible, film-like substrate 10d is shown fixed on the fixture 142. As depicted, the posts 144 are activated in preparation of routing the optical fibers 20 thereon. Excess cable or overlengths can be routed about the posts 144 to subsequently create the respective first and second coils 110, 112 on the flexible, film-like substrate 10d. In certain examples, the posts 144 may be actuated to route the optical fibers 20 on the flexible, film-like substrate 10d from the first section 114 to the second section 116 such that at least one of the plurality of fiber management tabs 104 secures the first optical fiber 20a to the second section 116. The flexible, film-like substrate 10d can be completely prepared or assembled on the fixture 142. Once the flexible, film-like substrate 10d is complete, the flexible, film-like substrate 10d can be released from the fixture 142 as shown in FIG. 23.

From the forgoing detailed description, it will be evident that modifications and variations can be made without departing from the spirit and scope of the disclosure.

What is claimed is:

1. A telecommunications enclosure comprising:
    a housing;
    a plurality of ruggedized fiber optic adapters secured to the housing, the ruggedized fiber optic adapters including hardened connector ports accessible from outside the housing and non-hardened connector ports accessible from inside the housing;
    a fiber manager positioned within the housing, the fiber manager being constructed from flexible sheet initially having a planar configuration prior to installation in the housing, the flexible sheet having a main body and at least one fold line that divides the flexible sheet into a first section and a second section, the flexible sheet being folded along the fold line into a non-planar configuration as positioned within the housing, the first section defining pass-through openings positioned adjacent to the non-hardened connector ports; and
    connectorized optical structures including optical fibers having connectorized ends, the optical fibers being bonded to the first section along fiber routing paths, the connectorized ends plugging into the non-hardened connector ports, and the connectorized optical structures extending through the pass-through openings defined by the first section.

2. The telecommunications enclosure of claim 1, further comprising fiber management tabs cut into the main body of the flexible sheet, the fiber management tabs having base ends that are unitary with the main body of the flexible sheet and opposite free ends.

3. The telecommunications enclosure of claim 1, wherein the housing includes a base and a cover, wherein the ruggedized fiber optic adapters mount to the cover, and wherein the fiber manager is positioned at least partially in the cover.

* * * * *